United States Patent
Shirakawa

(10) Patent No.: US 9,031,397 B2
(45) Date of Patent: *May 12, 2015

(54) IMAGING APPARATUS, FLASH DEVICE, AND CONTROL METHOD THEREOF

(71) Applicant: Canon Kabushiki Kaisha, Tokyo (JP)

(72) Inventor: Yusuke Shirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,891

(22) Filed: Aug. 12, 2014

(65) Prior Publication Data

US 2014/0347554 A1     Nov. 27, 2014

Related U.S. Application Data

(63) Continuation of application No. 14/049,120, filed on Oct. 8, 2013, now Pat. No. 8,837,930, which is a continuation of application No. 13/864,981, filed on Apr. 17, 2013, now Pat. No. 8,577,215, which is a continuation of application No. 13/463,184, filed on May 3, 2012, now Pat. No. 8,442,394, which is a continuation of application No. 12/700,098, filed on Feb. 4, 2010, now Pat. No. 8,195,040.

(30) Foreign Application Priority Data

Feb. 10, 2009  (JP) ................................. 2009-028766
Feb. 10, 2009  (JP) ................................. 2009-028803

(51) Int. Cl.
| | |
|---|---|
| G03B 17/00 | (2006.01) |
| H04B 7/26 | (2006.01) |
| G03B 15/05 | (2006.01) |
| H04N 5/225 | (2006.01) |

(52) U.S. Cl.
CPC ...... *H04B 7/26* (2013.01); *G03B 15/05* (2013.01); *H04N 5/2256* (2013.01)

(58) Field of Classification Search
USPC .......................................................... 396/56
See application file for complete search history.

(56) References Cited

U.S. PATENT DOCUMENTS

| | | | | |
|---|---|---|---|---|
| 4,738,526 | A * | 4/1988 | Larish ............................. | 396/89 |
| 6,404,987 | B1 * | 6/2002 | Fukui ............................. | 396/56 |
| 7,437,063 | B2 * | 10/2008 | Clark .............................. | 396/56 |
| 8,577,215 | B2 * | 11/2013 | Shirakawa ...................... | 396/56 |
| 2002/0127019 | A1 * | 9/2002 | Ogasawara ..................... | 396/661 |
| 2008/0298793 | A1 * | 12/2008 | Clark ............................. | 396/57 |
| 2009/0135262 | A1 * | 5/2009 | Ogasawara ................ | 348/211.4 |
| 2009/0185797 | A1 * | 7/2009 | Ogasawara ...................... | 396/59 |
| 2010/0008658 | A1 * | 1/2010 | King .............................. | 396/56 |
| 2010/0158494 | A1 * | 6/2010 | King .............................. | 396/56 |
| 2010/0209089 | A1 * | 8/2010 | King .............................. | 396/56 |

* cited by examiner

*Primary Examiner* — Rodney Fuller

(74) *Attorney, Agent, or Firm* — Canon USA, Inc. IP Division

(57) ABSTRACT

An imaging apparatus for performing wireless communication with an external device. An instruction transmitting unit transmits an operation instruction to the external device. A response signal receiving unit receives a response signal from the external device. A first controlling unit starts a first operation relating to an imaging process in a case that a first time passes from a point of receiving the response signal by the response signal receiving unit. The external device executes a second operation relating to the imaging process in a case that a second time passes from a point of transmitting the response signal from the external device to the imaging apparatus.

18 Claims, 23 Drawing Sheets

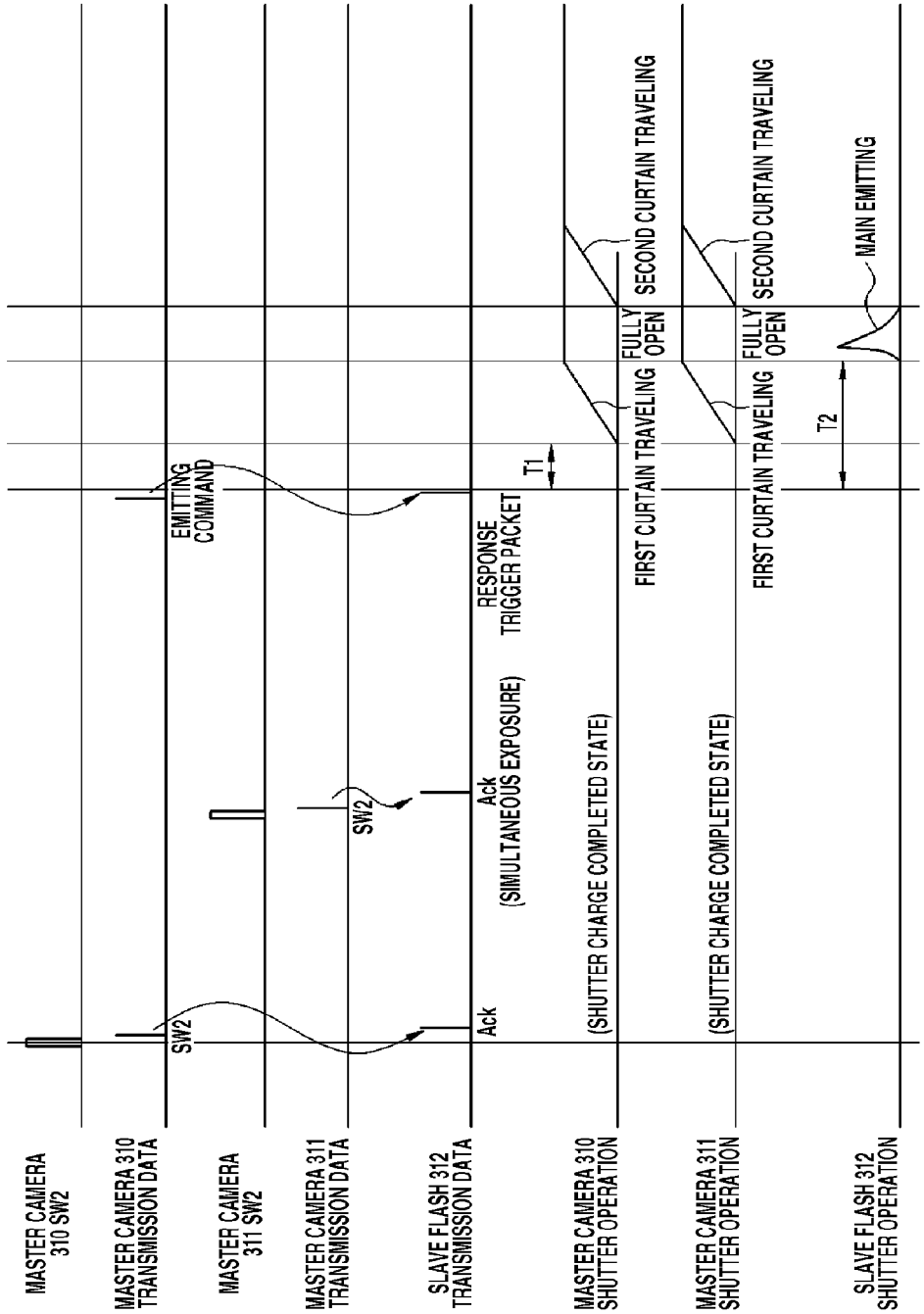

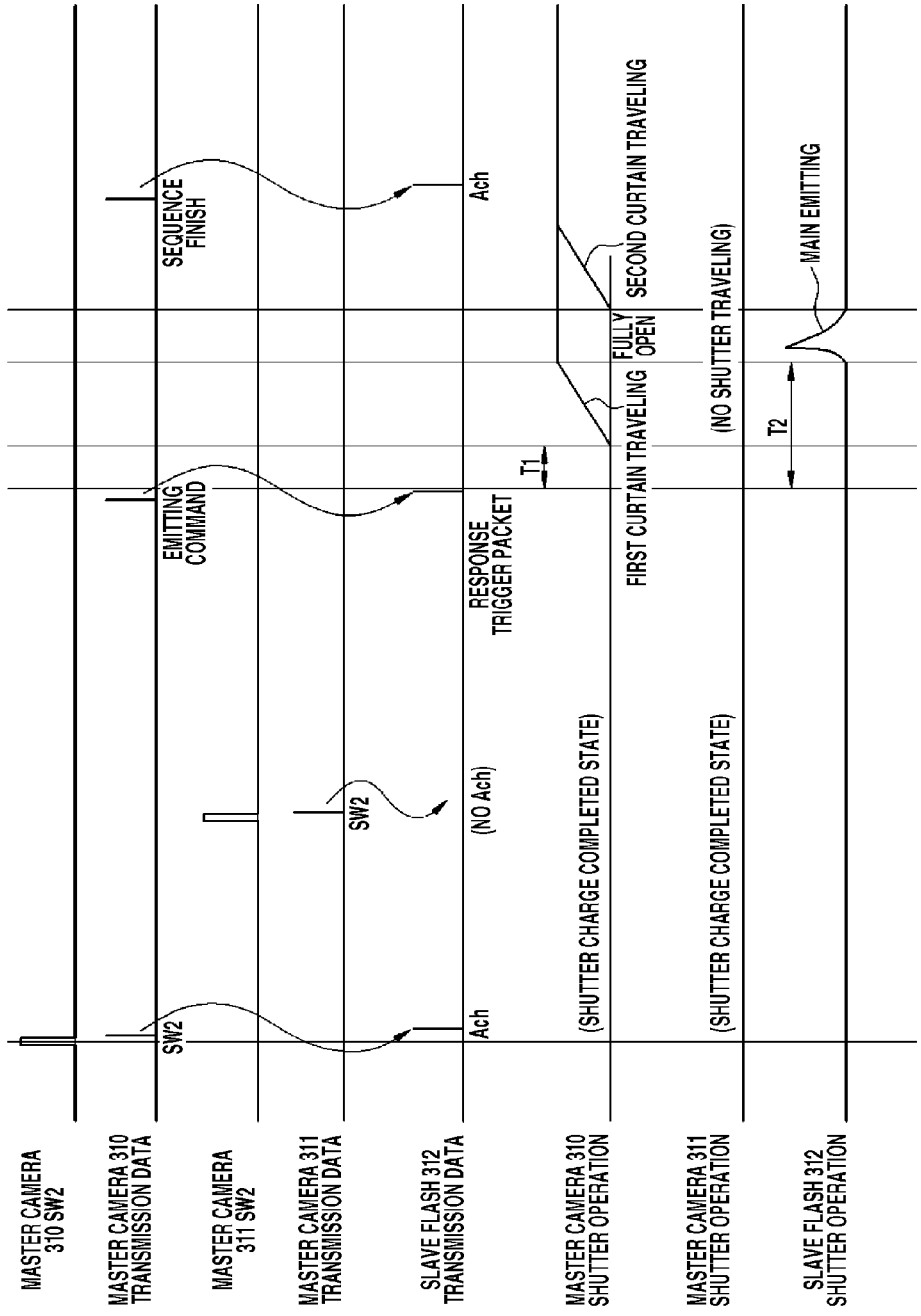

IMAGING APPARATUS, FLASH DEVICE, AND CONTROL METHOD THEREOF

CROSS-REFERENCED TO RELATED APPLICATIONS

This application is a Continuation of U.S. application Ser. No. 14/049,120, filed Oct. 8, 2013, which in turn is a Continuation of U.S. application Ser. No. 13/864,981, filed Apr. 17, 2013, which becomes U.S. Pat. No. 8,577,215 issued on Nov. 5, 2013; which in turn is a Continuation of U.S. application Ser. No. 13/463,184 filed May 3, 2012, which becomes U.S. Pat. No. 8,442,394 issued on May 14, 2013; which in turn is a Continuation of U.S. application Ser. No. 12/700,098 filed Feb. 4, 2010, which becomes U.S. Pat. No. 8,195,040 issued on Jun. 5, 2012, and which claims priority from Japanese Patent Applications No. 2009-028803 filed Feb. 10, 2009 and No. 2009-028766 filed Feb. 10, 2009, which are hereby incorporated by reference herein in their entirety.

BACKGROUND OF THE INVENTION

1. Field of the Invention

The present invention relates to imaging technology using an imaging apparatus and a flash device. More specifically, the present invention relates to an imaging apparatus, a flash device, and a flash control camera system, which configure a wireless communication system, and a synchronous imaging method and a program based on this wireless communication system.

2. Description of the Related Art

Conventionally, wireless communication systems using radio waves and light have been easier to use than wired communication systems, as there is no need to connect with a cable. However, wireless communication systems have been inferior in terms of communication reliability. For example, communication errors can occur when there is an obstruction in the communication pathway, interference caused by radio waves in the same frequency band, or incidence of strong light during communication. Therefore, communication reliability was ensured by providing an error correction mechanism or by re-transmitting a packet.

As a wireless communication system which is operated by synchronizing a plurality of devices, Japanese Patent Application Laid-Open No. 2000-89304 discusses a wireless flash system configured from a camera and a flash unit. This system uses light for wireless communication to realize a wireless multi-unit flash system which performs flash synchronous imaging at a high-speed shutter time of one several-hundredth of a second, and performs wireless centralized control of a plurality of flash units.

However, even in such a wireless flash system, the low reliability that wireless communication systems have is not totally resolved. For example, it is assumed that light communication is performed from a master flash unit to act as an emitting trigger for a slave flash unit. In this case, if another flash unit emits at the instant when the light communication acting as an emitting trigger is performed, the slave flash unit cannot distinguish the emitting trigger transmitted by the master flash unit from the another emitting, which can lead to unexpected emitting.

SUMMARY OF THE INVENTION

The present invention is directed to performing flash synchronous imaging by ensuring communication reliability in a wireless flash system configured from a camera and a flash unit.

According to an aspect of the present invention, an imaging apparatus for performing wireless communication with a flash device includes a generation unit configured to generate a plurality of emitting instructions which include timing information indicating a timing for emitting the flash device, wherein each emitting instruction includes different timing information, and a transmission unit configured to successively transmit the plurality of emitting instructions to the flash device, wherein the transmission unit transmits each emitting instruction in succession based on the timing information.

According to another aspect of the present invention, a flash device for performing wireless communication with an imaging apparatus includes a reception unit configured to receive at least one instruction from among a plurality of emitting instructions which are transmitted from the imaging apparatus and which each include different timing information, and an emitting control unit configured to perform emitting based on the timing information included in a received single emitting instruction from among the plurality of emitting instructions, and perform no emitting based other emitting instructions.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 22 is an example of a timing chart illustrating a sequence of flash synchronous imaging when exclusive control is not performed.

FIG. 23 is an example of a timing chart illustrating a sequence of flash synchronous imaging when exclusive control is performed.

DESCRIPTION OF THE EMBODIMENTS

Various exemplary embodiments, features, and aspects of the invention will be described in detail below with reference to the drawings.

Figure 1:
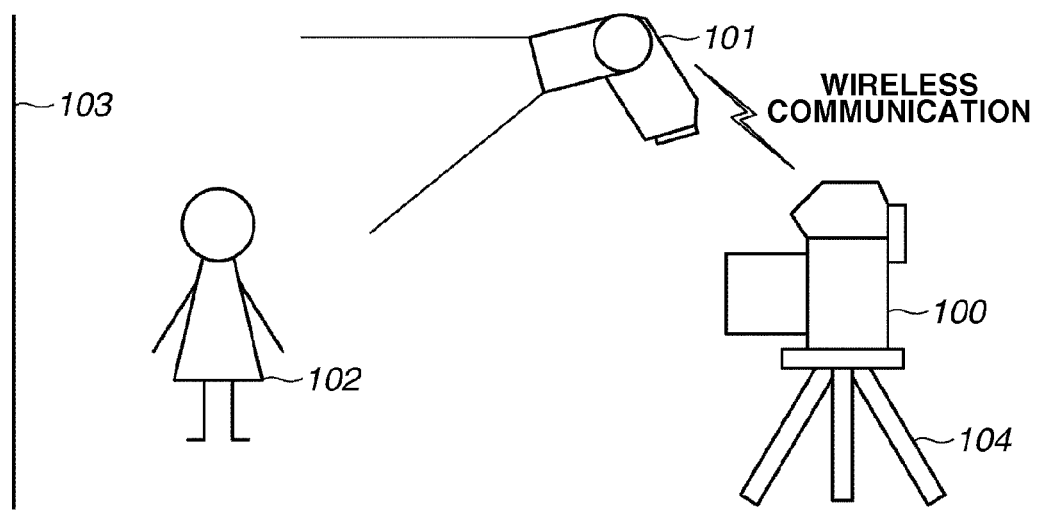
FIG. 1 is an example of a schematic diagram of a flash control camera system.

FIG. 1 is a schematic diagram of a flash control camera system according to a first exemplary embodiment to which the present invention is applied. The flash control camera system according to the present exemplary embodiment is a wireless flash system configured from a digital single lens reflex camera and a flash unit.

In FIG. 1, a digital single lens reflex camera 100 (hereinafter, "camera") is illustrated as an example of an imaging apparatus. A wireless communication circuit and a wireless antenna are built into the camera 100. An external flash unit 101 is an example of a flash device. Similar to the camera 100, a wireless communication circuit and a wireless antenna are built into the flash unit 101. The camera 100 and the flash unit 101 perform wireless communication based on a method such as the Institute of Electrical and Electronics Engineers (IEEE) 802.15.4, which is a known wireless communication standard.

FIG. 1 illustrates an example of flash imaging of an object 102 in a photographic studio which contains a screen 103 and a tripod 104 for holding the camera 100 steady. In the present exemplary embodiment, the camera 100 serves as a master device, and the flash unit 101 serves as a slave device. Flash synchronous imaging is performed synchronizing a shutter of the camera 100 and the emitting of the flash unit 101.

Figure 2:
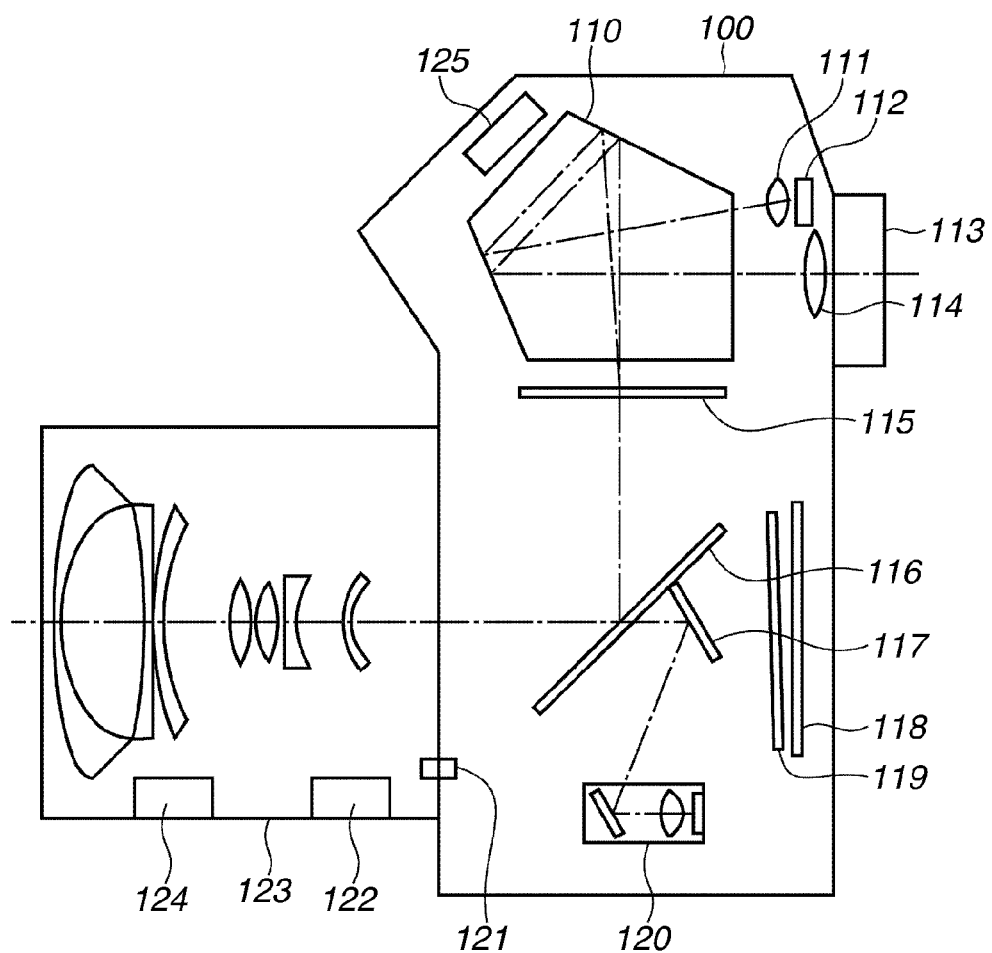
FIG. 2 is an example of a cross-sectional diagram illustrating mainly an optical configuration of a camera.

FIG. 2 is a cross-sectional diagram mainly for illustrating an optical configuration of the camera 100. A camera body houses optical components, mechanical components, electric circuits, an image sensor, a wireless antenna and the like. Using these components, the camera 100 performs photographic imaging. The camera 100 includes a main mirror 116, which is tilted toward or retracted from an imaging optical path based on an observation state and an imaging state. The main mirror 116 is a half mirror, which lets about half the light rays from the object pass through to the below-described focus detection optical system.

A focus plate 115 is arranged on an expected image-forming surface of an imaging lens 123. A pentaprism 110 is provided to change the optical path of a finder. The camera 100 also includes an eyepiece 113 and a finder eye lens 114. A photographer can observe an imaging screen by observing the focus plate 115 from a window of the eyepiece 113. An image-forming lens 111 and a light-metering sensor 112 measure the luminance of the object in the observation screen. The image-forming lens 111 places the light-metering sensor 112 and the focus plate 115 in a conjugate relation via a reflection optical path in the pentaprism 110.

The camera 100 also includes a shutter 119, and a complementary metal-oxide-semiconductor (CMOS) or charge-coupled device (CCD) type image sensor 118. The object is imaged by this image sensor 118. An analog output signal is digitally converted and output as digital data. The digital data further undergoes image processing to generate image data in a format such as Joint Photographic Experts Group (JPEG) and the like. This image data is recorded on a recording medium such as a CompactFlash (CF) card, a secure digital (SD) card and the like.

A sub-mirror 117 is provided for bending light rays from the object downward, and guiding the light rays to a focus detection unit 120. The focus detection unit 120 functions as a focus detection optical system, and is formed from a secondary image-forming mirror, a secondary image-forming lens, a focus detection sensor and the like. The focus detection unit 120 is an automatic focus detection unit, which detects a focus state of the object in the imaging screen based on a known phase difference detection method, and controls a focus adjustment mechanism of the imaging lens.

A mount contact unit 121 acts as an interface between the camera body and the lens 123. The mount contact unit 121 includes a contact for supplying a power source to the lens 123, and a signal contact for communicating with a lens microcomputer 152 (see FIG. 4). The lens 123 is mounted on the camera body. A lens drive motor 124 is provided to adjust the focus position of the imaging screen by moving some of the lenses among a plurality of imaging lenses in the lens 123 forward and backward along the optical axis. A lens diaphragm motor 122 is provided to adjust an imaging lens diaphragm to a desired diaphragm diameter by driving the imaging lens diaphragm in the lens 123.

The camera 100 also includes a wireless antenna 125 for transmitting and receiving data to/from a camera accessory such as an external flash unit, a remote control unit and the like using radio waves.

Figure 3:
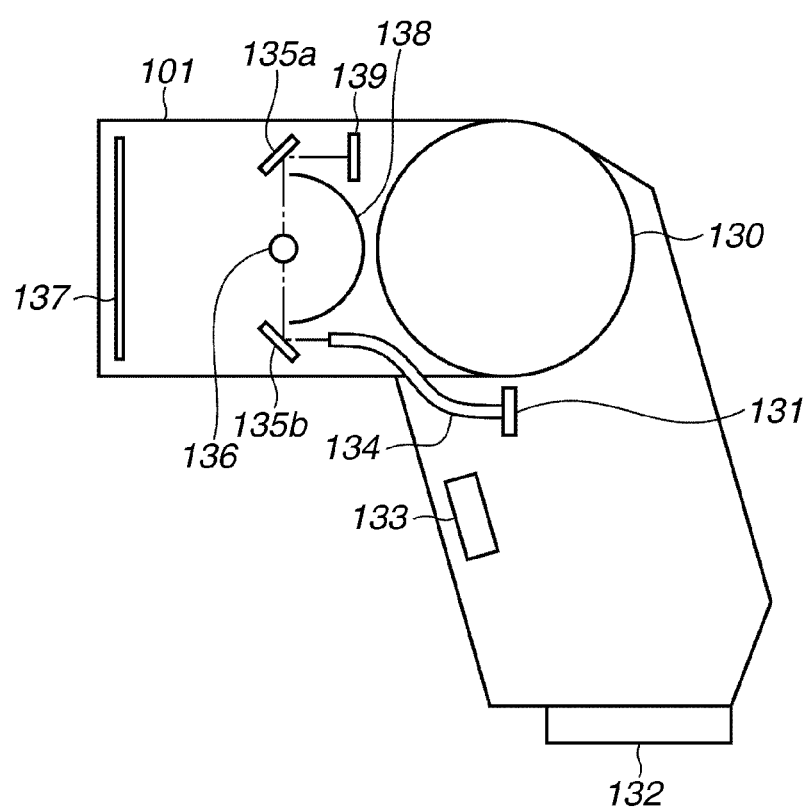
FIG. 3 is an example of a cross-sectional diagram illustrating a configuration of a flash unit.

FIG. 3 is a cross-sectional diagram illustrating a configuration of the flash unit 101. The flash unit 101 according to the present exemplary embodiment performs emitting control based on data from the camera 100. The flash unit 101 includes a wireless antenna 133 for transmitting and receiving data to/from the camera 100 using radio waves.

The flash unit 101 includes a xenon tube 136 (Xe tube) as a emitting unit, which converts current energy into light-emission energy. The flash unit 101 also includes a reflector 138 and a Fresnel lens 137. Both the reflector 138 and the Fresnel lens 137 serve a purpose of efficiently condensing the light-emission energy toward an object. An angle adjustment mechanism 130 is provided to change the angle of the emitting unit. A clip-on connector 132 is provided to mechanically fix the flash unit 101 to the camera 100 or a tripod.

The flash unit 101 also includes a light transmission unit 134 such as a glass fiber, and light-receiving element 131 such as a photodiode, which acts as a light-receiving unit to monitor the light emitted from the Xe tube 136. The light emitted from the Xe tube 136 is guided to the light-receiving element 131 via the light transmission unit 134 for direct measurement of the light amount in the pre-emitting and the main emitting of the flash unit 101. The flash unit 101 also includes a light-receiving element 139 such as a photodiode, which acts as a light-receiving unit to monitor the light emitted from the Xe tube 136. An output from the light-receiving element 139 regulates the emitting current of the Xe tube 136 to control flat light emission. Light guides 135a and 135b, which are integrated with the reflector 138, are provided to reflect and guide light from the Xe tube 136 to the light-receiving elements 131 and 139.

Figure 4:
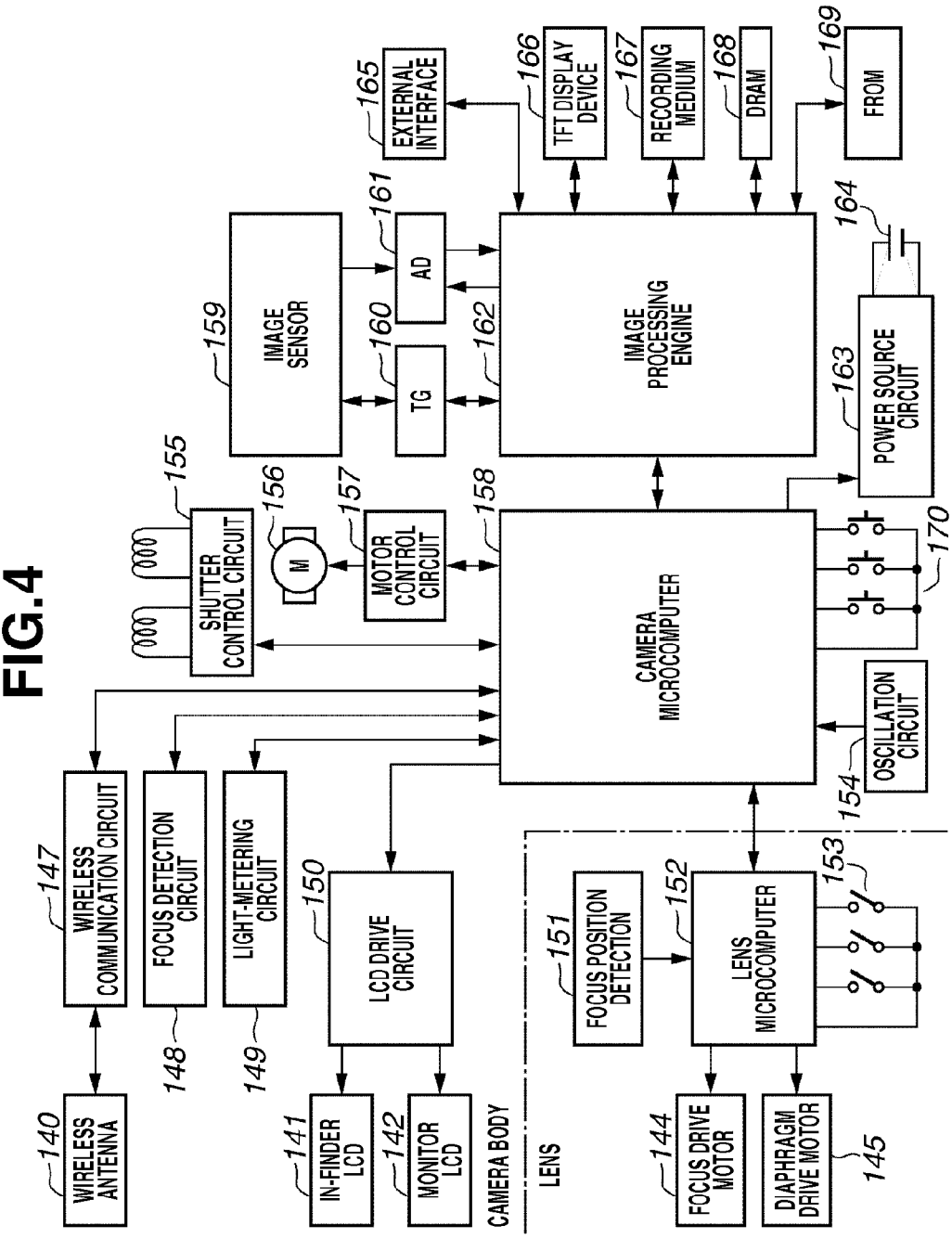
FIG. 4 is an example of an electric circuit block diagram of a camera.

FIG. 4 is an electric circuit block diagram of the camera 100 according to the present exemplary embodiment. The camera body includes a camera microcomputer 158, which is the main microcomputer for controlling the camera 100. The camera microcomputer 158 performs power source control, switch control, lens control, light-metering, focus control, shutter control, wireless communication control and the like.

The camera microcomputer 158 is connected to a power source circuit 163, a switch array 170 such as SW1 and SW2, an oscillation circuit 154, a wireless communication circuit 147, a focus detection circuit 148, and a light-metering circuit 149. In addition, the camera microcomputer 158 is also connected to a liquid crystal display (LCD) drive circuit 150, a shutter control circuit 155, a motor control circuit 157, an image processing engine 162 and the like. Signals are transmitted via the mount contact to the lens microcomputer 152 serving as a lens control circuit arranged in the lens 123. The external flash unit 101 exchanges wireless communication packets generated by the camera microcomputer 158 via the wireless communication circuit 147 and a wireless antenna 140 (corresponding to the wireless antenna 125). Consequently, signals are transmitted to a flash microcomputer of the flash unit 101 (see FIG. 5).

The camera microcomputer 158 is driven by a clock generated by the oscillation circuit 154. The camera microcomputer 158 performs correct time management by counting this clock. Consequently, the timing in the operation sequence of the whole camera, and the timing in the communication sequence with the external flash unit, the remote control unit and the like, are controlled.

The focus detection circuit 148 performs accumulation control and reading control of the focusing sensor based on a signal from the camera microcomputer 158, and outputs each pixel information to the camera microcomputer 158. The camera microcomputer 158 converts this analog information into digital data, and performs focus detection based on a known phase difference detection method. Based on the generated focus detection information, the camera microcomputer 158 performs focus adjustment of the lens by exchanging signals with the lens microcomputer 152 of the lens 123.

The light-metering circuit 149 outputs an output from the light-metering sensor as a luminance signal of the object to the camera microcomputer 158. The light-metering circuit 149 outputs luminance signals in both an ordinary state, in which flash light is not pre-emitted toward the object, and a pre-emitting state, in which flash light is pre-emitted toward the object. The camera microcomputer 158 converts the analog luminance signals into digital data for calculation of a diaphragm value to adjust imaging exposure, calculation of a shutter speed, and calculation of a flash main emitting amount used during exposure.

The shutter control circuit 155 controls the shutter 119 based on a signal from the camera microcomputer 158. This shutter 119 is a focal plane shutter. The shutter control circuit 155 controls two shutter drive magnets configuring the focal plane shutter to cause a shutter curtain to travel, and carry out an exposure operation.

The motor control circuit 157 performs up/down movement of the main mirror 116 and charging of the shutter 119 by controlling a motor 156 based on a signal from the camera microcomputer 158.

SW1 of the switch array 170 is turned on by a first stroke of a release button, whereby light-metering and autofocus (AF) start. SW2 is turned on by a second stroke of the release button, whereby the exposure operation starts. Signals from SW1, SW2, and other not-illustrated operation members of the camera are detected by the camera microcomputer 158.

The LCD drive circuit 150 controls a display of an in-finder LCD 141 and a monitor LCD 142 based on a signal from the camera microcomputer 158.

The image processing engine 162 is a processor mainly for performing digital image processing. Based on a program stored in a FROM 169, the image processing engine 162 performs control of the image sensor 159 (corresponding to the image sensor 118), as well as control of image processing, image display, image recording and the like.

When there is an imaging control request from the camera microcomputer 158, the image processing engine 162 performs accumulation control and reading control of the image sensor 159 via a timing generator (TG). An image signal read from the image sensor 159 is converted from an analog signal into digital data by an analog/digital (AD) converter 161. The digital data is input into the image processing engine 162, and then temporarily stored in a dynamic random access memory (DRAM) 168. The image signal temporarily stored in the DRAM 168 is re-read in the image processing engine 162, and image processing such as known color-complement processing, white balance processing, gamma processing is performed.

Finally, the image signal is converted into digital image data such as JPEG. When the digital image data is generated, the digital image data is again temporarily stored in the DRAM 168. In addition, the digital image data is also displayed for a quick preview on a thin-film transistor (TFT) display device, and recorded on a recording medium 167. If the camera 100 is connected to an external device such as a personal computer (PC) via an external interface 165, the digital image data is not only recorded in the recording medium 167, but also transmitted to the external device.

In the lens 123, a focus position detection circuit 151, a focus drive motor 144 (corresponding to the lens drive motor 124), a diaphragm drive motor 145 (corresponding to the lens diaphragm motor 122) and the like are connected to the lens microcomputer 152. The lens microcomputer 152 drives the focus drive motor 144 and the diaphragm drive motor 145 to control the focus adjustment and the diaphragm of the lens.

Figure 5:
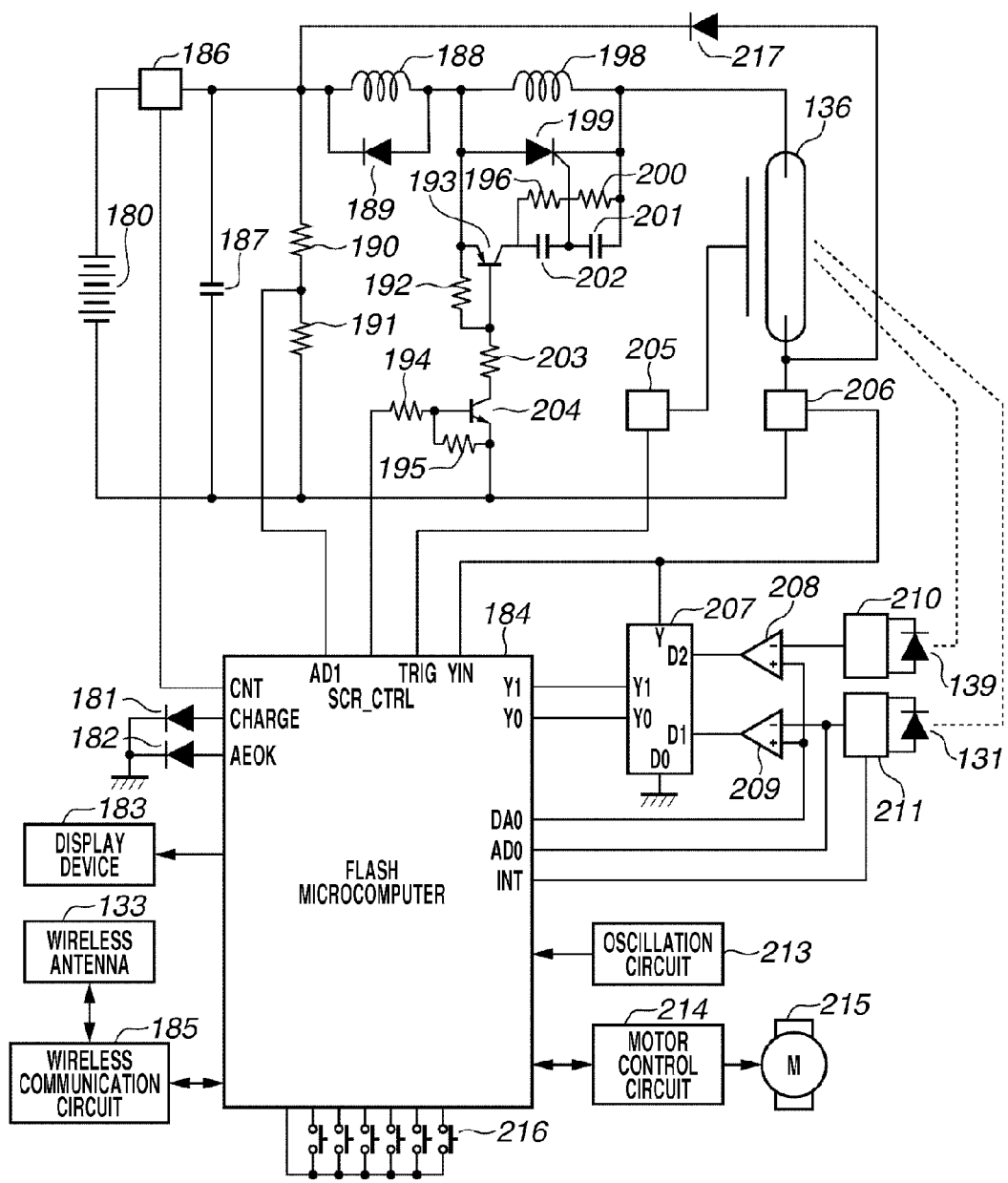
FIG. 5 is an example of an electric circuit block diagram of a flash unit.

FIG. 5 is an electric circuit block diagram of the flash unit 101 according to the present exemplary embodiment. The flash unit 101 includes a battery 180 acting as a power source, and a known direct current/direct current (DC/DC) converter 186, which increases the battery voltage to 100 V. A main capacitor 187 is provided to accumulate the light-emission energy. Resistors 190 and 191 are provided to divide the voltage of the main capacitor 187 in a predetermined ratio.

The flash unit 101 also includes a first coil 188 for controlling the emitting current, a first diode 189 for absorbing back voltage generated when emitting is stopped, a second coil 198 for controlling the emitting current, a second diode 217 for absorbing back voltage generated in the coil 198 when emitting is stopped, the Xe tube 136, a trigger generation circuit 205, and a emitting control circuit 206 such as an insulated gate bipolar transistor (IGBT).

A thyristor 199 is provided as a switching element for bypassing the coil 198. The thyristor 199 bypasses the emitting current during flash emitting so that the current does not flow to the coil 198 in order to improve the stop control properties when emitting is stopped.

A resistor 196 is provided to flow the current to a gate, which is a control electrode of the thyristor 199 to turn the thyristor 199 on. A gate potential stabilizing resistor 200 is provided to prevent the thyristor 199 from turning on due to noise applied to the thyristor gate when the thyristor 199 is in an OFF state. A capacitor 202 is provided to quickly turn the thyristor 199 on. A noise absorbing capacitor 201 is provided to prevent the thyristor 199 from turning on due to noise applied to the thyristor gate when the thyristor 199 is in an OFF state. A transistor 193 is provided to switch the gate current of the thyristor 199. A transistor 204 is provided to switch the transistor 193. Resistors 192, 203, 194, and 195 are also provided.

A data selector 207 is provided to output data to Y by selecting D0, D1, and D2 based on a combination of two inputs Y0 and Y1. A comparator 208 is provided for emitting intensity control of flat light emission. A comparator 209 is provided to control over the light emission amount during flash emitting. The photodiode 139 is a light-receiving sensor used for flat light emission control. The photodiode 139 monitors the light output from the Xe tube 136. A light-metering circuit 210 is provided to amplify a minute current flowing to the photodiode 139 and to convert the photocurrent into a voltage. The photodiode 131 is a light-receiving sensor used for flash light emission control. The photodiode 131 monitors the light output from the Xe tube 136. A light-metering integration circuit 211 is provided to logarithmically compress the photocurrent flowing to the photodiode 131 and to compress and integrate the light emission amount from the Xe tube 136.

The flash microcomputer 184 controls the operations of the whole flash unit. A display device 183, such as a liquid crystal display, displays an operating state of the flash unit. The flash unit 101 is also provided with a wireless communication circuit 185, the wireless antenna 133, and a switch array 216 such as a power source control main switch, a backlight lighting switch, a emitting mode switching switch and the like. An LED 181 is provided to display charge completion of the flash unit. A light adjustment display LED 182 is provided to display the fact that imaging was performed at an appropriate light amount from the flash unit. The flash unit 101 also includes a motor control circuit 214. A motor 215 is provided to move the Xe tube 136 and the reflector 138 to match the focus distance of the lens 123 mounted on the camera body to set an irradiation angle.

Next, each of the terminals of the flash microcomputer 184 will be described. A control output terminal CNT is provided to control charging of the DC/DC converter 186. An input terminal YIN is provided for detection of an output state of the data selector 207. An integration control output terminal INT is provided for integration and control of the light-metering integration circuit 211. An A/D conversion input terminal AD0 is provided to read an integrated voltage indicating the light emission amount of the light-metering integration circuit 211. A D/A output terminal DA0 is provided to output a comparator voltage of comparators 208 and 209. Selection state setting output terminals Y0 and Y1 are provided to set the selection state of the data selector 207. A emitting trigger generation output terminal TROG is also provided. A control output terminal SCR_CTRL is provided to control the thyristor 199.

Next, using FIG. 6, a sequence of flash synchronous imaging will be described when there are one camera 100 and one flash unit 101 as illustrated in FIG. 1. First, based on a known wireless pairing, the camera 100 and the flash unit 101 are pre-registered with each other as a communication party.

If the power source of the camera 100 is turned on, and the camera 100 is set to flash emitting mode, the camera microcomputer 158 of the camera 100 controls the wireless communication circuit 147, scans channels across the wireless frequencies, and detects the flash unit 101 which is the communication party. If the power source of the flash unit 101 is turned on, similar to the camera 100, the flash unit 101 controls the wireless communication circuit 185, sets the channel to be used, and sets itself to a state in which it can respond to the detection from the camera 100.

If the camera 100 finds the flash unit 101 based on the detection, the camera 100 establishes a network by starting to issue a periodic beacon packet (beacon signal) as a network coordinator. The flash unit 101 serves a role of a network device, and links with the camera 100 as a communication party so that the camera 100 and the flash unit 101 can communicate at any time.

After a system configured from the camera 100 and the flash unit 101 has thus been started up, in step S101, the camera 100 is in a state of waiting for a release operation from the user (SW1 ON standby state). In this state, by setting the interval of the periodically-issued beacon packet to a comparatively long interval of 100 milliseconds, the reception operation frequency of the wireless communication circuit 185 of the flash unit 101 can be suppressed. Consequently, the power consumption of the flash unit 101 can be reduced.

In step S101, when SW1 is turned on (YES in step S101), the processing proceeds to step S102. In step S102, the camera 100 proceeds to a focus adjustment operation. Then, in step S103, the processing waits for SW2 to be turned on. When SW2 is turned on in step S103 (YES in step S103), the processing proceeds to step S104. In step S104, to acquire under the control of the camera microcomputer 158 the charge state of the flash unit 101, the camera 100 communicates with the flash unit 101 to acquire charge information indicating the charge state of the flash unit 101. Then, in step S105, the camera 100 determines whether flash emitting is possible.

If it is determined in step S105 that flash emitting is possible (YES in step S105), the processing proceeds to a light adjustment operation. The light adjustment operation includes a light-metering operation 1 of the ambient light in step S106, and a light-metering operation 2 in a flash pre-emitting state in steps S107 and S108. Based on the thus-obtained light-metering information, the shutter speed, the diaphragm value, and the light emission amount of the flash unit 101 are calculated.

Next, in step S109, the camera 100 performs a setting communication about the light emission amount with the flash unit 101 under the control of the camera microcomputer 158. Consequently, the flash unit 101 completes emitting preparation, and the flash unit 101 is in a emitting trigger communication standby state. In step S110, under the control of the camera microcomputer 158, the camera 100 raises the mirror, controls the diaphragm, starts first curtain traveling of the shutter 119, and starts accumulation by controlling the image sensor 118.

When the shutter 119 approaches a fully open state, in step S111, under the control of the camera microcomputer 158, the camera 100 performs a emitting trigger communication, which is a emitting instruction. While this stage will be described in more detail below, a plurality of emitting triggers including timing information is successively transmitted to the flash unit 101. The timing information included in each emitting trigger is differentiated based on that transmission order. This processing is an example of processing performed by a emitting instruction transmission control unit.

The flash unit 101 is emitted based on the timing information included in the emitting trigger which was received first among the plurality of emitting triggers successively transmitted from the camera 100. Consequently, in step S112, the flash unit 101 emits light to match the timing that the shutter 119 becomes fully open. Therefore, flash imaging synchronous with the shutter first curtain is performed. This processing is an example of processing performed by a emitting control unit.

In step S113, under the control of the camera microcomputer 158, the camera 100 performs second curtain traveling of the shutter 119 based on the shutter speed determined by the light-metering operation. Then, in step S114, the image sensor 118 is controlled to read, whereby the captured image data is read to complete the flash synchronous imaging sequence.

Figure 6:
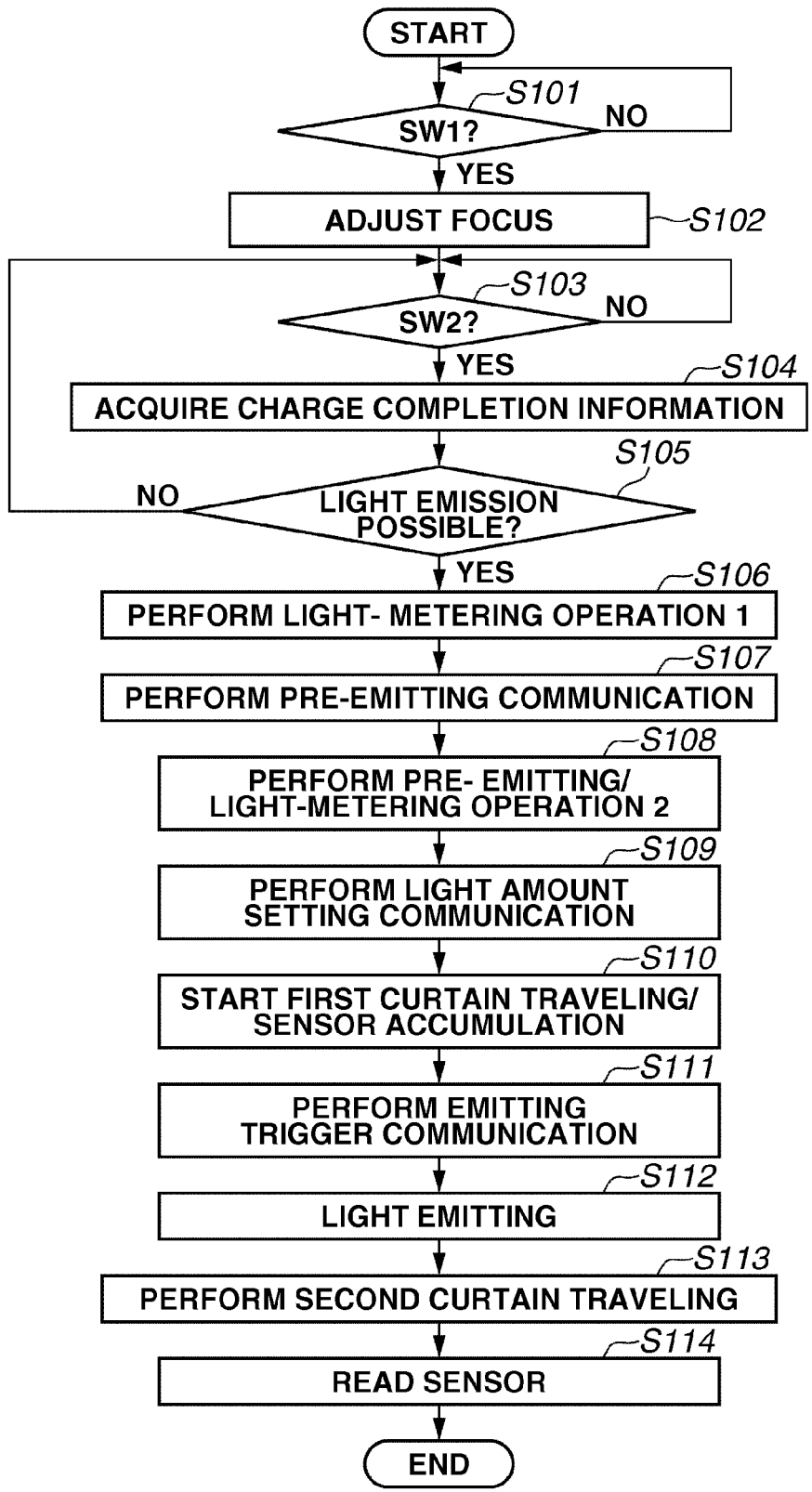
FIG. 6 is an example of a flowchart illustrating a sequence of flash synchronous imaging.
Figure 7:
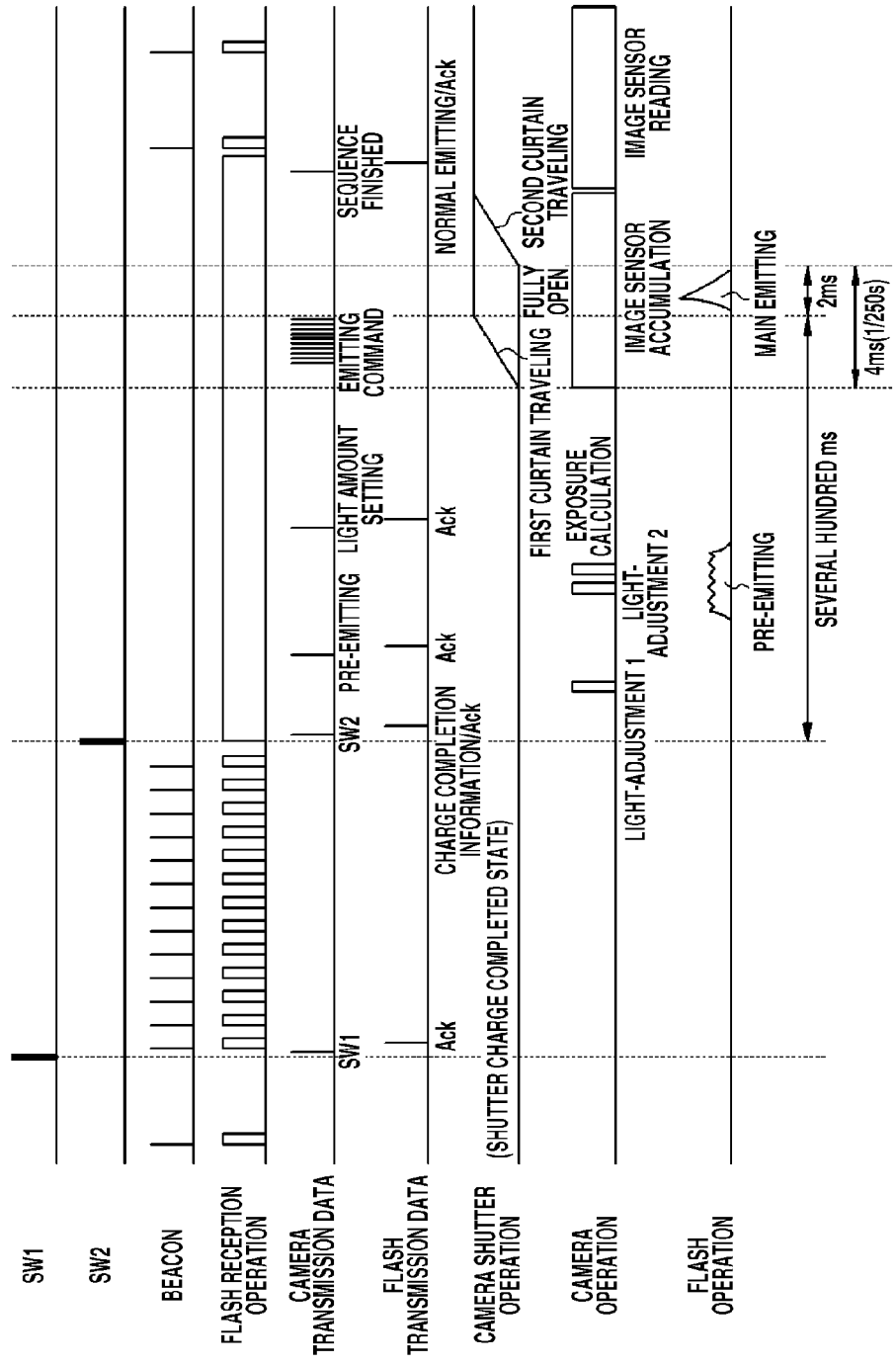
FIG. 7 is an example of a timing chart illustrating a sequence of flash synchronous imaging.

FIG. 7 illustrates the flowchart of FIG. 6 in the form of a timing chart. Before SW1 is turned on, the camera 100 is issuing a beacon packet at 100 millisecond intervals. The flash unit 101 performs control so that the beacon packets can be constantly received, by operating the wireless communication circuit 185 at 100 millisecond intervals. The time required to receive the beacon packet is several milliseconds. In an idle state when there is no particular need for communication, during the period from completion of the reception operation until the next reception operation, the wireless communication circuit 185 on the flash unit side does not have to operated. This allows power consumption to be reduced.

When SW1 is turned on, at a timing immediately after the beacon packet is received, the camera 100 transmits a packet to notify the flash unit 101 that SW1 was turned on (camera transmission data SW1). Along with this, the camera 100 changes the issuance interval of the beacon packets, which has been 100 milliseconds until then, to a shorter interval of about 10 milliseconds. By thus changing the beacon packet issuance interval before and after the release operation, the reaction response of the flash unit 101 is improved the next time SW2 is turned on. With the shortened beacon packet interval, the timing of the reception operation on the flash unit 101 side is also shortened to match the beacon interval. Consequently, while the response improves, the operation frequency of the wireless communication circuit 185 is increased, and power consumption is higher.

When SW2 is turned on, at a timing immediately after the beacon packet is received, the camera 100 transmits a packet to notify the flash unit 101 of the fact that SW2 was turned on (camera transmission data SW2). The flash unit 101 checks its own charge state, and if the flash unit 101 is in a state in which emitting is possible, the flash unit 101 notifies the camera 100 side of that fact (charge information/Ack of the flash transmission data). Along with this, the flash unit 101 is set to a state in which wireless packets can constantly be received.

After set to such a state, the steps S106 to S110 of FIG. 6 are successively executed. More specifically, the camera 100 proceeds to the light adjustment operation (light adjustment 1, light adjustment 2, exposure calculation of the camera operations), as well as pre-emitting communication, and light amount setting communication (pre-emitting and light amount setting of the camera transmission data).

Each time a packet is received from the camera 100, the flash unit 101 transmits an Ack packet to ensure communication reliability. If an Ack packet is not received from the flash unit 101 for a transmitted packet even after a fixed duration has elapsed, the camera 100 determines that a communication error has occurred, and performs re-transmission processing by transmitting the same packet again.

After the light amount setting communication is performed in step S109, the flash unit 101 is in a state in which a emitting command packet, which is a command packet for synchronized operation, can be received at any time. More specifically, the flash unit 101 is in a standby state in which main emitting and synchronous imaging is possible at any time.

Then, the camera 100 starts the traveling of the first curtain. When the shutter 119 approaches a fully open state, the camera 100 successively transmits a plurality of emitting command packets as a emitting trigger to the flash unit 101 (emitting command of the camera transmission data). These packets are synchronized command packets which include timing information. In FIG. 7, ten emitting command packets are transmitted. In FIG. 7, the shutter speed indicates synchronous imaging of $\frac{1}{250}$ seconds, in which the time from when the shutter 119 starts to travel until full open is 2 milliseconds, and the full open time of the shutter 119 is 2 milliseconds. Therefore, in this case, during the 2 millisecond period from when the shutter 119 starts to travel until full open, ten emitting command packets are transmitted. Although in the present exemplary embodiment the number of emitting command packets is ten, the same effects can be obtained as long as there is a plurality of emitting command packets, and this number may be arbitrarily set.

If any one of the emitting command packets from among the ten emitting command packets can be received, the flash unit 101 performs main emitting to match the timing of the shutter 119 being fully open, so that flash synchronous imaging can be performed. Once any one of the emitting command packets is received, it is no longer necessary to receive the remaining emitting command packets, and thus the flash unit 101 finishes the reception operation.

With the start of the first curtain traveling of the shutter 119, the camera 100 controls the image sensor 118 to be in an accumulation state. Further, with completion of the second curtain traveling of the shutter 119, the camera 100 changes the image sensor 118 from an accumulation state to a reading state, and starts reading of the image data.

Simultaneously with this, the camera 100 transmits a packet notifying the flash unit 101 that the sequence has finished (sequence of the camera transmission data finishes). If a emitting command packet is received and the emitting is normally performed, the flash unit 101 communicates that fact to the camera 100 (normal emitting/Ack of the flash transmission data). The camera 100 determines that the image captured this time is an image obtained when flash emitting is performed normally. Further, when recording the image, the camera 100 attaches this determination to a file as information about the imaging conditions, and stores the resultant file. On the other hand, if flash imaging is not performed normally, the camera 100 attaches that determination to the image file, and records the resultant file.

If the sequence finishes in this manner, the camera 100 and the flash unit 101 return to an idle state of waiting for SW1. More specifically, the camera 100 again periodically issues a beacon packet at 100 millisecond intervals, and in response to the packet, the flash unit 101 performs a reception operation to operate the wireless communication circuit 185 at 100 millisecond intervals.

Figure 8:
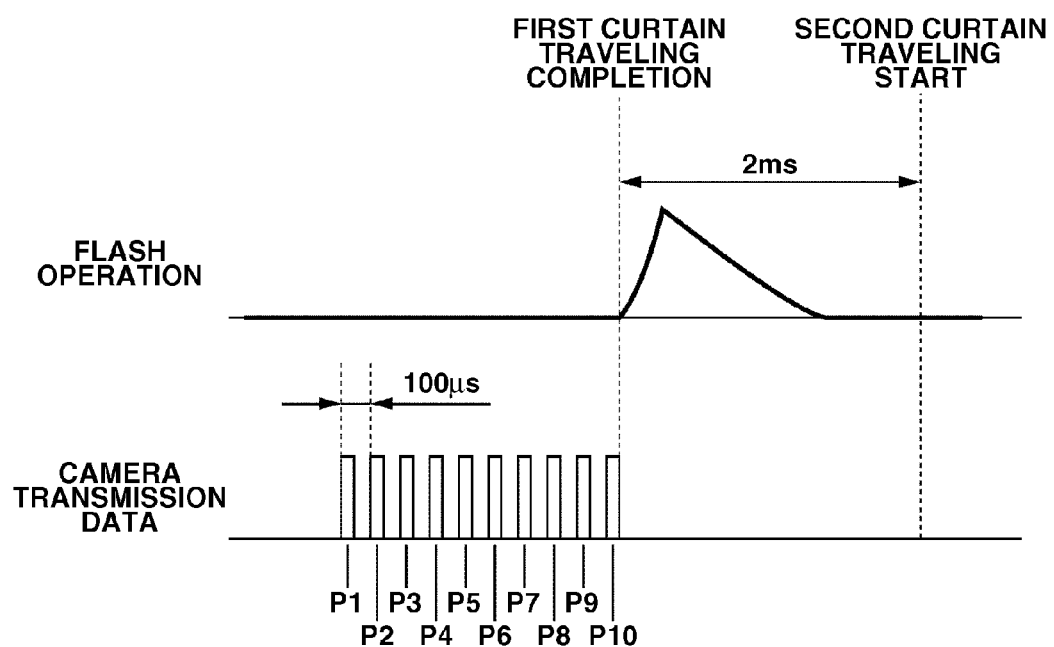
FIG. 8 is an example of a timing chart illustrating camera transmission data and a flash operation at a emitting command packet transmission timing.
Figure 9:
FIG. 9 is an example illustrating a packet data structure of a emitting command packet.

FIG. 8 is a timing chart illustrating in detail the camera transmission data at the emitting command packet transmission timing and the flash operation of FIG. 7. FIG. 9 illustrates a packet data structure of a emitting command packet.

In FIG. 8, the timing of completion of the first curtain traveling is a target timing of synchronous imaging. In the present exemplary embodiment, an example is described based on first curtain synchronous imaging in which completion timing of the shutter first curtain traveling and the flash emitting are synchronized. However, similar effects can also be obtained if the present invention is applied to second curtain traveling, in which start timing of the shutter second curtain traveling and the flash emitting are synchronized. Moreover, similar effects can also be obtained if the present invention is applied to high-speed synchronous imaging, in which start timing of the shutter first curtain traveling and the flash emitting start are synchronized.

In FIG. 8, transmission of a first emitting command packet P1 starts at a timing which goes back by adding 900 microseconds to the time it takes for packet transmission from the timing of first curtain traveling completion.

As illustrated in FIG. 9, the emitting command packet is a packet having a 16-bit length. The emitting command packet is generated by the camera microcomputer 158. The emitting command packet does not have to be a 16-bit packet with a structure like that illustrated in FIG. 9. However, by employing a simple packet having a comparatively short length as illustrated in FIG. 9, the time taken for the transmission of the packet itself, and the time taken to analyze the packet when it is received can be shortened. Consequently, the temporal accuracy of the synchronization operation can be increased.

If the wireless communication system has a transfer speed of 250 kbps, the time taken to transmit one emitting command packet is 64 microseconds. Therefore, transmission of the first emitting command packet P1 is started 964 microseconds before first curtain traveling completion. This communication timing is accurately managed by the camera microcomputer 158 which counts the clock.

The emitting command packet P1 includes a 4-bit code (e.g., "code 0001") indicating the flash unit 101 as transmission destination information, and an 8-bit code (e.g., "01011010") which indicates that it is a emitting command packet. Further, the emitting command packet P1 includes a 4-bit code (e.g., "0001") as timing information, indicating that it is the first emitting command packet.

Similarly, a emitting command packet P2 includes the same "0001" as the first emitting command packet P1 as transmission destination information, and "01011010" indicating that it is a emitting command packet. Further, the emitting command packet P2 includes "0010" as timing information, indicating that it is the second emitting command packet. Transmission of the emitting command packet P2 starts 864 microseconds before first curtain traveling completion.

Similarly, a emitting command packet P3 includes the same "0001" for the emitting command packets P1 and P2 as transmission destination information, and "01011010" indicating that it is a emitting command packet. Further, the emitting command packet P3 includes "0011" as timing information, indicating that it is the third emitting command packet. Transmission of the emitting command packet P3 starts 764 microseconds before first curtain traveling completion.

A emitting command packet P4 and subsequent emitting command packets are similarly transmitted. Transmission of the final emitting command packet P10 starts 64 microseconds before first curtain traveling completion. Therefore, the timing when transmission is completed generally matches the timing of first curtain traveling completion. In the present exemplary embodiment, the transmission completion timing and the first curtain traveling completion timing generally match. However, the operation timing may differ depending on the circuit configuration and the program, and the required specifications may differ depending on the system. Therefore, the timing does not have to precisely match, as long as the operations can be synchronized within the required specifications.

When a emitting command packet is received, the packet is analyzed by the wireless communication circuit 185 of the flash unit 101. If it is determined that the transmission destination information is addressed to the flash unit 101, and the packet is a emitting command packet, the wireless communication circuit 185 generates an interrupt signal to the flash microcomputer 184. The flash microcomputer 184 receives this interrupt signal, and determines what number command packet the timing information has. The flash unit 101 associates the timing information with the emitting timing and holds this data. For example, the timing information "0001" is held in association with the emitting timing "900 microseconds". This association is performed so that, if a packet is received in which the timing information is "0001", emitting is performed 900 microseconds after reception. Based on the determination of the timing information, if it is determined that the packet is the first emitting command packet P1, a clock generated by an oscillation circuit 213 starts to be counted, and control is performed so that the main emitting is performed 900 microseconds later. In this case, reception of the subsequent emitting command packets P2 to P10 is not performed.

If reception of the emitting command packet P1 fails, reception of the emitting command packet P2 is attempted. If reception of the emitting command packet P2 is successful, control is performed so that the main emitting is performed 800 microseconds later.

If reception of the emitting command packets P1 to P9 fails, and reception of the final emitting command packet P10 is successful, the flash unit 101 performs control so that the main emitting is performed once reception is completed.

In the present exemplary embodiment, unlike ordinary communication, after reception of the emitting command packet, the flash unit 101 starts preparing for the main emitting, and avoids performing unnecessary operations. Therefore, the flash unit 101 does not return an Ack packet to the camera 100. However, an Ack packet may be returned. By returning an Ack packet, the transmission of subsequent emitting command packets is stopped by the camera 100 side. Accordingly, unnecessary wireless communication can be reduced.

Thus, among the plurality of emitting command packets, the packet which is received first is analyzed. Based on the timing information included in that packet, the timing of the main emitting is controlled by changing the clock count number. Ultimately, no matter which packet is received, the flash unit 101 can perform the main emitting with the same timing. Consequently, synchronous imaging between the camera 100 and the flash unit 101 at the correct timing can be performed.

As described above, simple communication packets are used, called "synchronization command packets" (emitting command packets), which contain timing information. Therefore, the flash unit 101 can be operated in synchronization at the correct time in which the time taken for a single communication is short. In addition, response is good. Further, just by the release operation once performed by the user, the camera 100 transmits a plurality of emitting command packets. If the flash unit 101 receives even one of those emitting command packets, the flash unit 101 emits at the correct timing. Therefore, even in a communication environment where a lot of interference is occurring and one out of several communication packets is lost, the reliability of the communication pathway is high, and the accuracy of the synchronization operation can be increased.

Consequently, a highly-reliable wireless flash system can be built without downgrading features such as flash synchronous speed, as compared with a cable-connected flash system and a clip-on type flash system. Further, while the timing information in the present exemplary embodiment indicates what number the emitting command packet is, the timing information may, for example, indicate how many seconds after reception of the emitting command packet, emitting can be performed.

Figure 10:
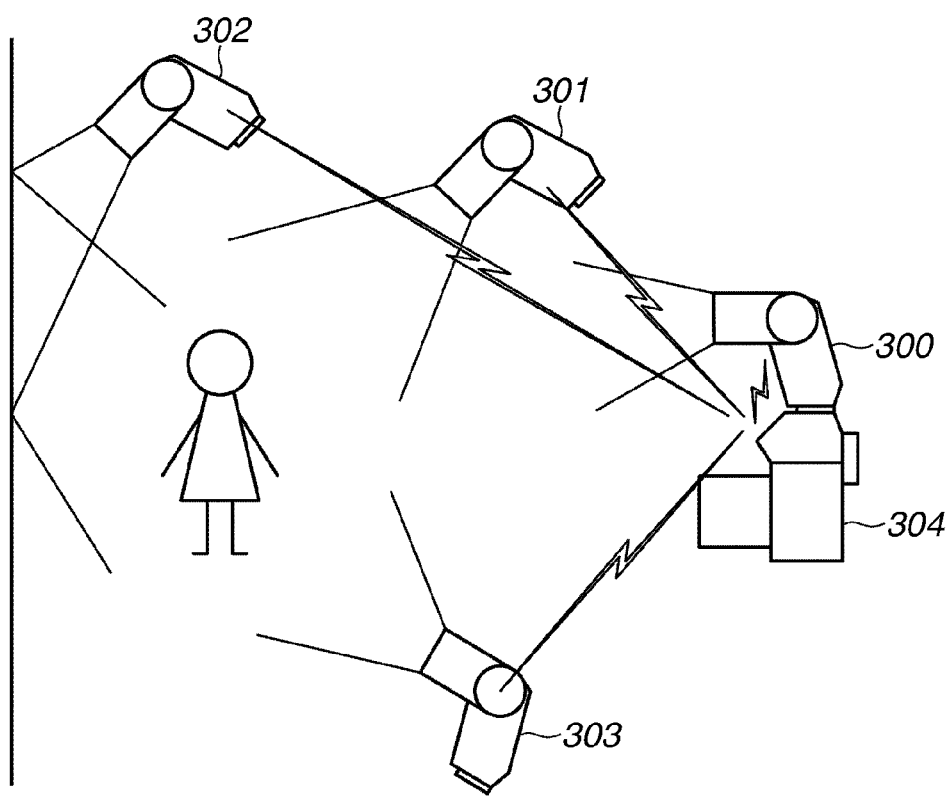
FIG. 10 is an example of a schematic diagram of a multi-unit flash control camera system.

FIG. 10 is a schematic diagram of a flash control camera system according to a second exemplary embodiment. In the second exemplary embodiment, an example is described in which the present invention is applied to a multi-unit flash control camera system configured from one digital single lens reflex camera 304 and four flash units 300 to 303.

Similar to the first exemplary embodiment, a wireless communication circuit and a wireless antenna are built into the digital single lens reflex camera 304 and each of the flash units 300 to 303, thereby enabling wireless communication. In the present exemplary embodiment, the camera 304 serves as a master device, and the four flash units 300 to 303 serve as slave devices. The four flash units 300 to 303 are emitted simultaneously based on an operation from the camera 304, so that flash synchronous imaging is performed.

In FIG. 10, the flash unit 300 is clipped onto a shoe of the camera 304, thereby being integrally connected to the camera 304. The other flash units 301, 302, and 303 are arranged at separate positions. The wireless antennas are each facing in different directions. Therefore, the radio wave state when performing wireless communication with the camera 304 is different for each unit.

When the release operation of the camera 304 is performed, multi-unit flash synchronous imaging is performed in the same imaging sequence as in FIG. 6 of the first exemplary embodiment.

Figure 11:
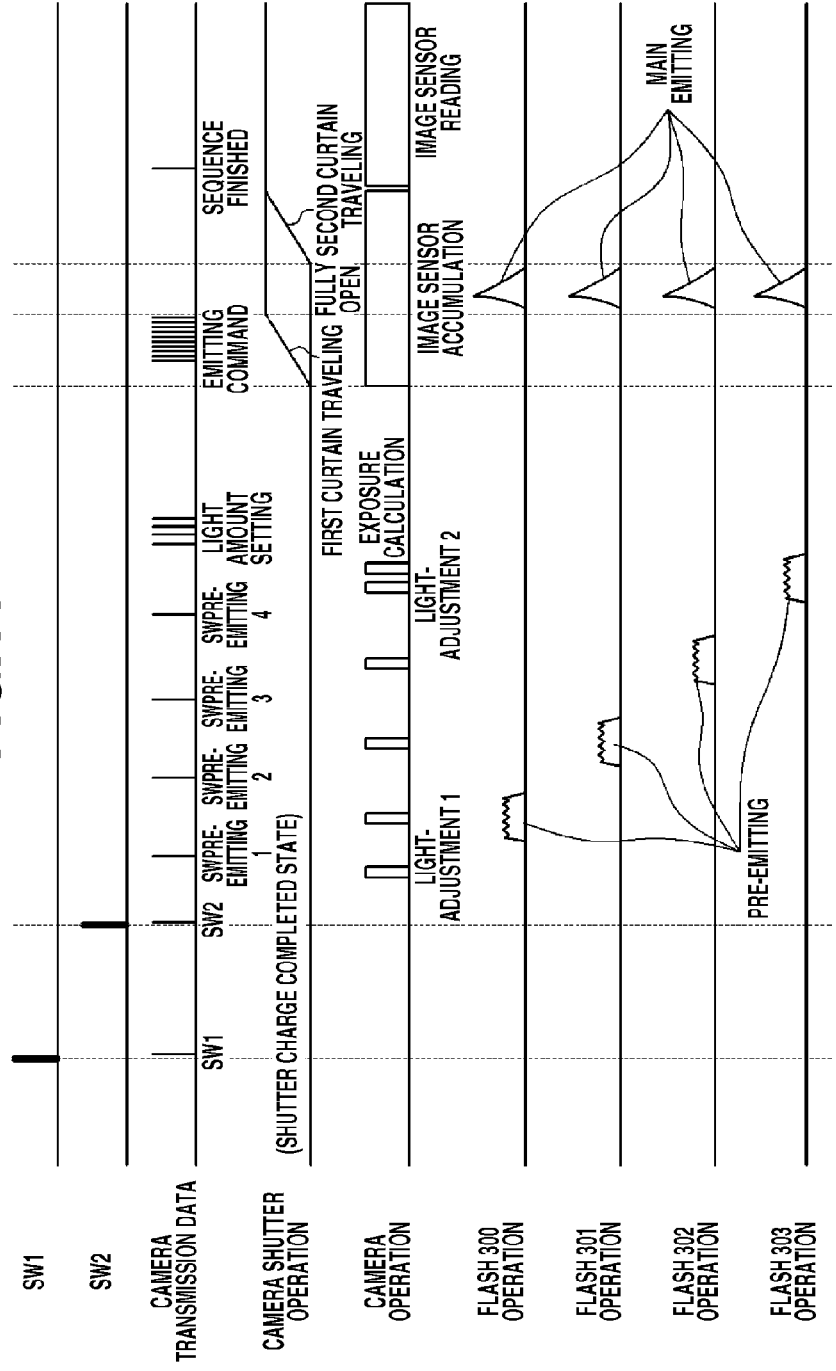
FIG. 11 is an example of a timing chart illustrating a sequence of multi-unit flash synchronous imaging.

FIG. 11 illustrates a multi-unit flash synchronous imaging sequence in the form of a timing chart. When SW1 is turned on, similar to the first exemplary embodiment, the camera 304 transmits a packet to notify each of the flash units 300 to 303 that SW1 was turned on. Unlike the first exemplary embodiment, since there is a plurality of communication party flash units, the communication packet is transmitted simultaneously to the four flash units 300 to 303 as a broadcast packet.

Similarly, when SW2 is turned on, the packet is also broadcast to the four flash units 300 to 303, and the four flash units 300 to 303 proceed to imaging preparation. At this stage, among the four flash units 300 to 303, if emitting preparation cannot be performed for some reason, such as one of the flash units not being completely charged, the camera 304 notifies the user of that fact using the display unit.

If all four flash units 300 to 303 proceeded to imaging preparation, the camera 304 performs the light adjustment operation in a non-emitting state. Then, the camera 304 performs pre-emitting communication for each flash unit, and causes the four flash units 300 to 303 to pre-emit and undergo the light adjustment operation. An overall exposure calculation is thus performed by performing the light adjustment operation in a pre-emitting state for each of the four flash units 300 to 303. In the final exposure calculation, the user can also perform the exposure calculation by leaving it up to the camera. The light emission amount can also be calculated in a state in which the user has set an arbitrary light emission ratio for each of the four flash units 300 to 303. Further, the light emission amount for each of the flash units may be manually set without performing an exposure calculation in the camera 304.

When the exposure calculation is thus finished, the camera 304 performs light amount setting communication with each of the four flash units 300 to 303. Consequently, the imaging preparation of the multi-unit flash control camera system is finished.

When the imaging preparation is finished, the camera 304 makes the first curtain of the shutter 119 travel. Similar to the first exemplary embodiment, when the shutter 119 approaches a fully open state, the camera 304 transmits a plurality of emitting command packets, which include timing information, as a synchronization command packet to the four flash units 300 to 303. In the present exemplary embodiment, similar to the first exemplary embodiment, ten emitting command packets are transmitted to make all of the four flash units 300 to 303 emit. Therefore, the broadcast destinations of the emitting command packets are all four flash units.

As described above, because each of the four flash units 300 to 303 are arranged at separate positions, and are facing toward a different direction, the radio wave state during wireless communication with the camera 304 is different for each flash unit. Therefore, even if the flash unit 300 received the first emitting command packet, that does not mean that the flash units 301, 302, and 303 also similarly received the first emitting command packet. However, for whichever flash unit, if any one of the ten emitting command packets is received, that flash unit can perform main emitting with the same timing as the other flash units.

Thus, ultimately all of the flash units 300 to 303 emit at the timing when the shutter 119 of the camera 304 is fully open, thereby enabling multi-unit flash synchronous imaging to be performed.

Figure 12:
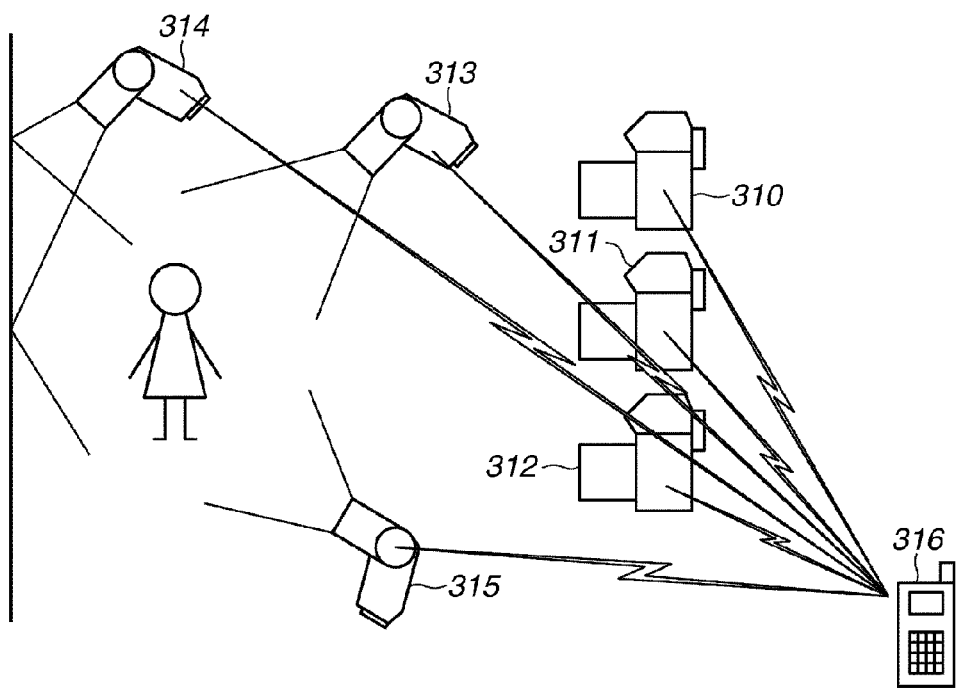
FIG. 12 is an example of a schematic diagram of a multi-unit flash control camera system.

FIG. 12 is a schematic diagram of a flash control camera system according to a third exemplary embodiment. In the third exemplary embodiment, an example is described in which the present invention is applied to a flash control camera system configured from digital single lens reflex cameras 310 to 312, flash units 313 to 315, and a camera release remote control unit (hereinafter referred to as "remote control unit") 316, which is an example of a remote operation apparatus.

Similar to the first and second exemplary embodiments, a wireless communication circuit and a wireless antenna are built into the three cameras 310 to 312, the three flash units 313 to 315, and the remote control unit 316, thereby enabling wireless communication. In the present exemplary embodiment, the remote control unit 316 serves as the master device, and the three cameras 310 to 312 and the three flash units 313 to 315 serve as slave devices. The three flash units 313 to 315 are emitted simultaneously based on an operation from the remote control unit 316, so that the three cameras 310 to 312 are simultaneously released and flash synchronous imaging is performed.

When the release operation of the remote control unit 316 is carried out, the imaging sequence is performed, and flash synchronous imaging is performed.

When the imaging preparation is finished, as a synchronization command packet, the remote control unit 316 transmits a plurality of packets to the three cameras 310 to 312. These packets give instructs for first curtain traveling start of the shutter 119. In this case, the packet destination is only the cameras 310 to 312. These synchronization command packets include timing information which is each different based on the timing for transmitting the command, so that ultimately the system can perform the synchronization operation. This processing is an example of processing performed by an imaging operation start instruction transmission control unit. Therefore, if the cameras 310 to 312 can receive even one of the plurality of synchronization command packets, the first curtain traveling of the shutter 119 can be started with the same timing. This processing is an example of processing performed by an imaging operation start control unit.

When the first curtain of the shutter 119 of the cameras 310 to 312 travels in such a manner, similar to the first and second exemplary embodiments, the remote control unit 316 transmits a plurality of emitting command packets to the flash units 313 to 315 at a timing at which the first curtain is about to finish traveling. In this case, the packet destination is only the flash units 313 to 315. These emitting command packets include timing information which is each different based on the timing for transmitting the command, so that ultimately the system can perform the synchronization operation. Therefore, if the flash units 313 to 315 can receive even one of the plurality of emitting command packets, main emitting can be performed with the same timing.

Thus, the remote control unit 316 transmits a plurality of synchronization command packets to each of the cameras 310 to 312 and the flash units 313 to 315 to enable the system to perform flash synchronous imaging. Consequently, ultimately all of the camera and the flash units can be synchronized, thereby enabling synchronous imaging to be performed.

Figure 13:
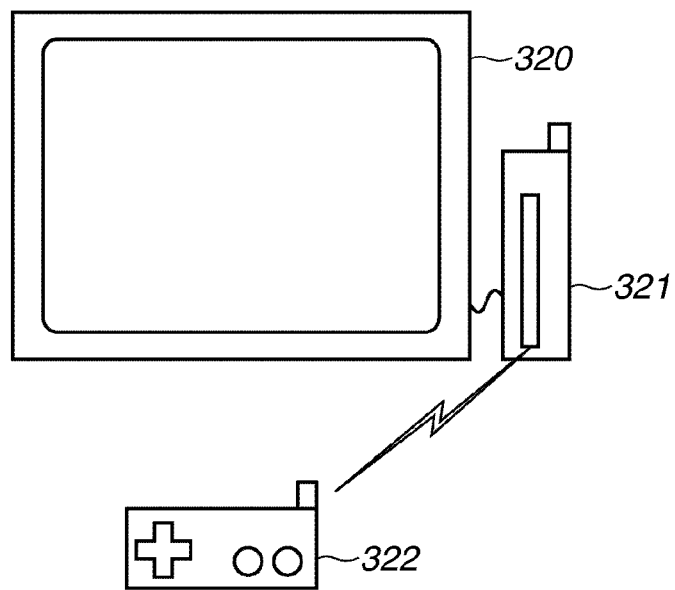
FIG. 13 is an example of a schematic diagram of another wireless communication system.

In the first to third exemplary embodiments, the present invention was applied to a camera system configured from a camera and an accessory. On the other hand, a fourth exemplary embodiment can also be applied to a different field while the same advantageous effects can be obtained. FIG. 13 is a schematic diagram for a case where the present invention is applied to a game device which uses wireless communication. The system illustrated in FIG. 13 includes a display 320, a game device body 321, and an operation remote control unit 322. An audio output speaker is built in the operation remote control unit 322. By pushing a button, the operation remote control unit 322 transmits information that the button was pushed by wireless communication, and audio sound is output based on the situation.

When a wireless communication packet is received, the game device body 321 outputs the audio and video based on the situation independently of the operation remote control unit 322. At this stage, if the timing of the audio output from the operation remote control unit 322 is different, the user gets a strange feeling.

Accordingly, the game device body 321 transmits a plurality of synchronization command packets to the operation remote control unit 322. Consequently, the video and the audio outputs on the game device body 321 side and the audio output on the operation remote control unit 322 side are synchronized, thereby enabling outputs to be performed with the same timing.

In the first to third exemplary embodiments, an imaging method was described in which emitting command packets are continuously transmitted. However, in the fifth to seventh exemplary embodiments, an imaging method is described which uses an Ack signal from the flash unit. The exemplary embodiment has many parts which are common to the first to third exemplary embodiments. Therefore, a description of the common parts will be omitted, and the present exemplary embodiment will be described focusing on the parts which are specific to it.

First, a fifth exemplary embodiment will be described. The external flash unit 101 exchanges wireless communication packets via a wireless communication circuit 147 and a wireless antenna 140 (corresponding to the wireless antenna 125). Consequently, signals are exchanged with a flash microcomputer 184 of the flash unit 101 (see FIG. 5). The wireless communication packets are generated by the camera microcomputer 158. The generated wireless communication packets combine packet transmission destination information, operation command information for controlling an operation, and information about the camera 100 as packet transmission source information. These pieces of information are stored in a memory in the camera microcomputer 158. Analysis of the received packets is performed by the camera microcomputer 158. In this case, the packet transmission destination information and the packet transmission source information are analyzed. If a packet is determined to be self-addressed, the information contained in the packet is further analyzed, and an operation is performed based on that analysis.

Figure 14:
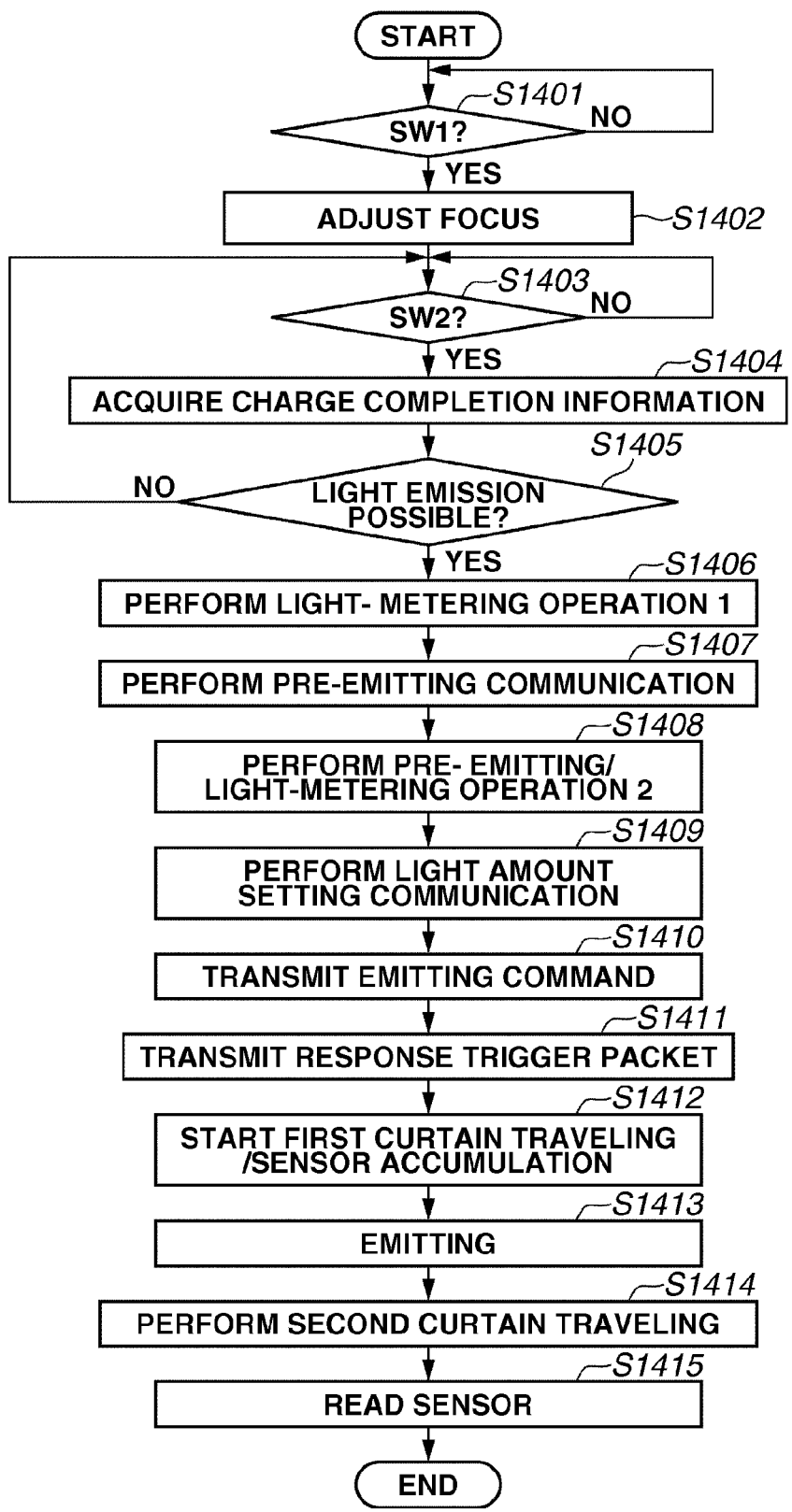
FIG. 14 is an example of a flowchart illustrating a sequence of flash synchronous imaging.

Next, using FIG. 14, a flash synchronous imaging sequence is described in a case where there is one camera 100 and one flash unit 101, as illustrated in FIG. 1. Since this sequence has a lot of the same processing as in the sequence illustrated in FIG. 6, this sequence will be described focusing on the parts which are specific to it.

Step S1401 to S1408 are the same as in the sequence of FIG. 6, and thus a description thereof will be omitted.

In step S109, the camera 100 performs a setting communication about the light emission amount with the flash unit 101 under the control of the camera microcomputer 158. Consequently, emitting preparation is completed at the flash unit 101, and the flash unit 101 is in a emitting command communication standby state. In step S1410, under the control of the camera microcomputer 158, the camera 100 raises the mirror, controls the diaphragm, and performs a emitting command communication for transmitting a emitting command, which is a emitting instruction, to the flash unit 101, which is a specific slave device.

In step S1411, when the flash unit 101 receives a emitting command from the camera 1000, the flash unit 101 transmits a response trigger packet, which is a response trigger signal, to the camera 100, which is the transmission source of the emitting command.

When the camera 100 receives the response trigger packet from the flash unit 101, the packet code of the response trigger packet, the packet transmission source information, and the response destination information are analyzed by the camera microcomputer 158. Based on those results, in step S1412, if it is determined that the response destination is the camera 100, the transmission source is the flash unit 101, and the packet code is a response trigger packet, the camera 100 starts the first curtain traveling of the shutter 119 after a predetermined period of time has elapsed. Further, the camera 100 controls the image sensor 118, and starts accumulation.

When the response trigger packet is transmitted, in step S1413, the flash unit 101 waits for a predetermined period of time to elapse, and then performs the emitting operation. Consequently, shutter-and-first-curtain-synchronous flash imaging is performed. The operations of the subsequent steps S1414 and S1415 are the same as the sequence of FIG. 6.

Figure 15:
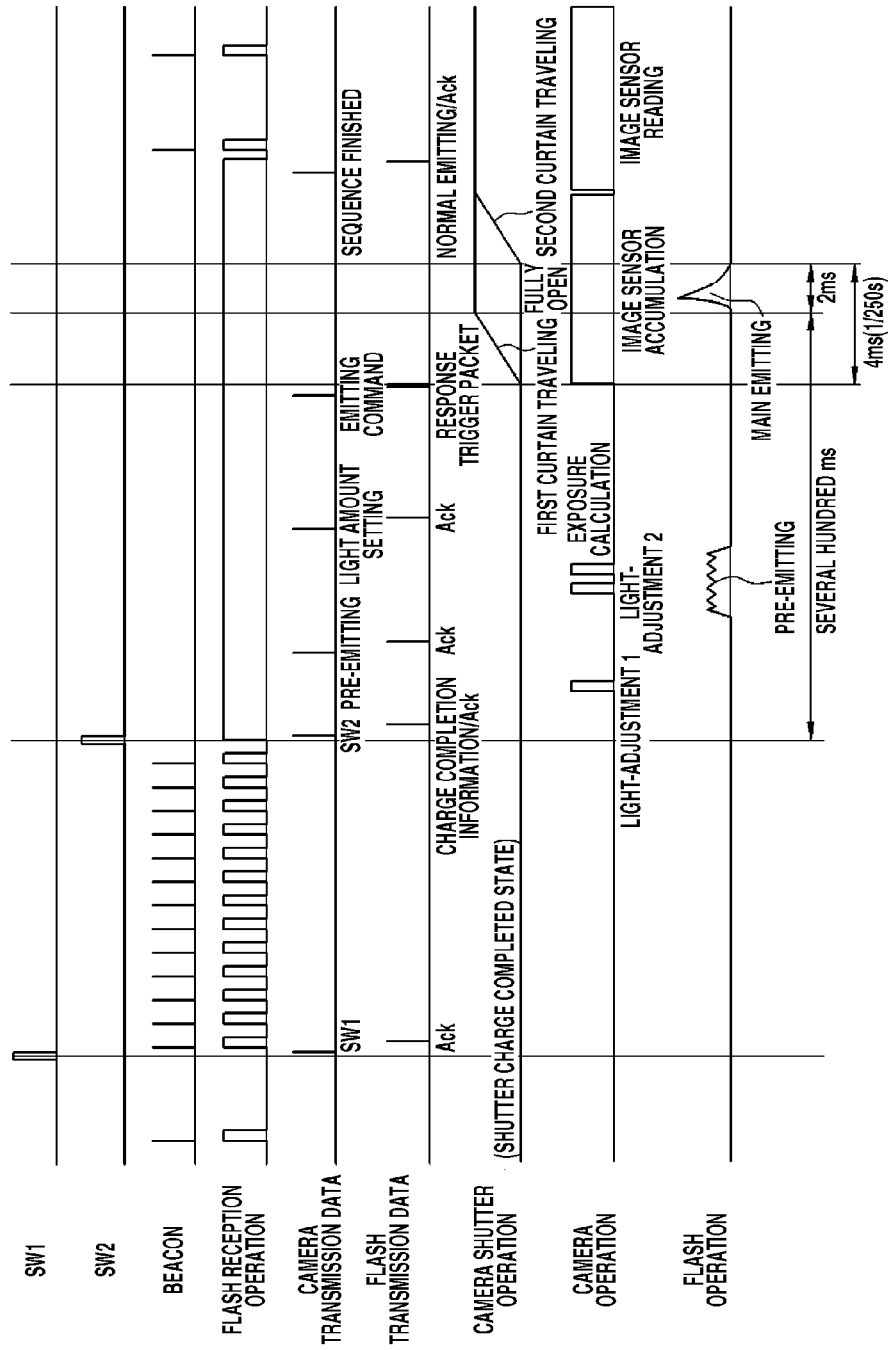
FIG. 15 is an example of a timing chart illustrating a sequence of flash synchronous imaging.
Figure 16:
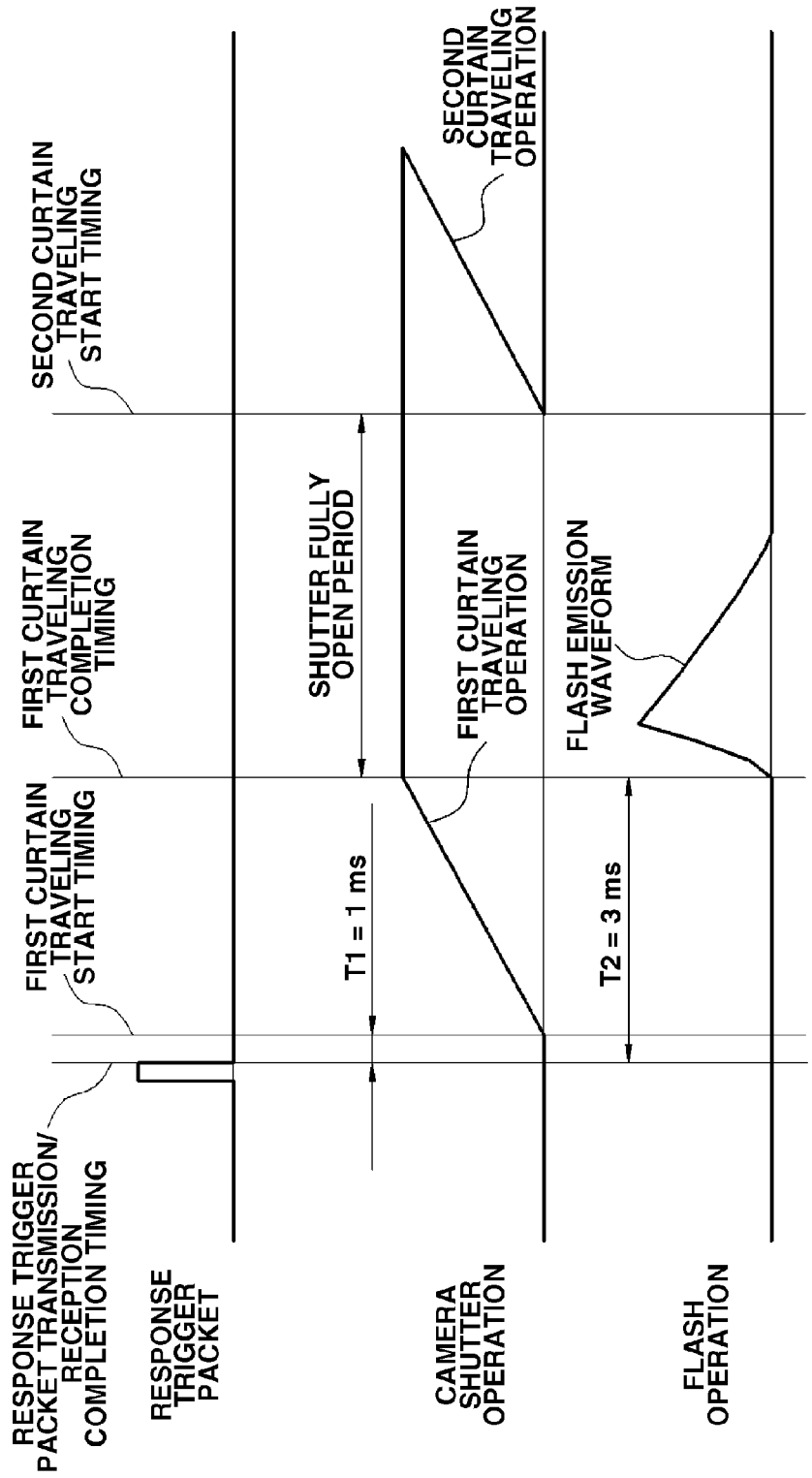
FIG. 16 is an example of a timing chart illustrating a camera shutter operation and a flash operation at a response trigger packet transmission/reception timing.

FIGS. 15 and 16 illustrate the flowchart of FIG. 14 in the form of a timing chart. Before SW1 is turned on, the camera 100 is issuing a beacon packet at 100 millisecond intervals. The flash unit 101 is controlled so that the beacon packets can constantly be received by performing a reception operation which operates the wireless communication circuit 185 at 100 millisecond intervals. The time required to receive the beacon packet is several milliseconds. In an idle state when there is no particular need for communication, during the period from when the reception operation is finished until the next reception operation is started, the wireless communication circuit 185 on the flash unit side does not have to operated. This allows power consumption to be reduced.

When SW1 is turned on, at a timing immediately after the beacon packet is received, the camera 100 transmits a packet to notify the flash unit 101 that SW1 was turned on (camera transmission data SW1). Along with this, the camera 100 changes the issuance interval of the beacon packets, which has been 100 milliseconds until then, to a shorter interval of about 10 milliseconds. By thus changing the beacon packet issuance interval before and after the release operation, the reaction response of the flash unit 101 is improved the next time SW2 is turned on. With the shortened beacon packet interval, the timing of the reception operation on the flash unit 101 side is also shortened to match the beacon packet interval. Consequently, while the response improves, the operation frequency of the wireless communication circuit 185 is increased, and power consumption becomes higher.

When SW2 is turned on, at a timing of immediately after the beacon packet is received, the camera 100 transmits a packet to notify the flash unit 101 of the fact that SW2 was turned on (camera transmission data SW2). The flash unit 101 checks its own charge state, and if the flash unit 101 is in a state in which emitting is possible, the flash unit 101 notifies the camera 100 side of that fact (charge information/Ack of the flash transmission data). Along with this, the flash unit 101 is set such that wireless packets can constantly be received.

After the flash unit 101 is set to such a state, the steps S1406 to S1409 of FIG. 14 are successively executed. More specifically, the camera 100 proceeds to the light adjustment operation, as well as pre-emitting communication, and light amount setting communication (pre-emitting and light amount setting of the camera transmission data).

Each time a packet is received from the camera 100, the flash unit 101 transmits an Ack packet to ensure communication reliability. If an Ack packet is not received from the flash unit 101 even after a fixed duration has elapsed for a transmitted packet, the camera 100 determines that a communication error has occurred, and performs re-transmission processing by transmitting the same packet again.

After the light amount setting communication is performed in step S1409, the flash unit 101 is in a state in which a emitting command packet, which is a command packet for synchronized operation, can be received at any time. More specifically, the flash unit 101 is in a standby state in which main emitting and synchronous imaging is possible at any time.

When the camera 100 finishes processing such as light-metering and focusing, and is in a state capable of shutter traveling, the camera 100 transmits a emitting command packet to the flash unit 101 (emitting command of the camera transmission data).

Figure 17:
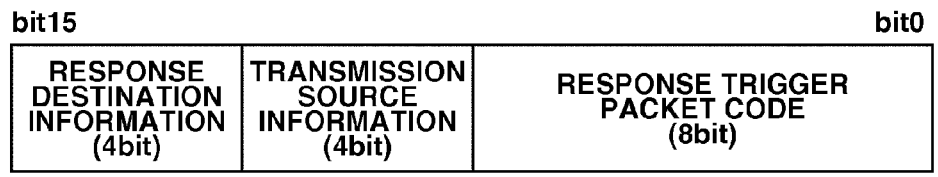
FIG. 17 is an example illustrating a packet data structure of a response trigger packet.

The flash unit 101 receives and analyzes the emitting command packet. If it is determined based on the analyzed result that the emitting command packet is a self-addressed packet, the flash unit 101 generates a response trigger packet, and transmits this response trigger packet to the camera 100 (response trigger packet of the flash transmission data). The response trigger packet has a structure like that illustrated in FIG. 17, which includes information indicating the camera 100 as response destination information (transmission destination information), information indicating the flash unit 101 as transmission source information, and code information representing the response trigger packet. The response trigger packet has a 16-bit length.

If it is assumed that the communication speed of the wireless communication is 250 kbps, the time taken to transmit the response trigger packet is about 64 microseconds. Assuming that the time for transmitting the radio waves is sufficiently short with respect to the communication speed, the time taken to receive the response trigger packet is about 64 microseconds, which is the same as the time taken for transmission. In the present exemplary embodiment, while the response trigger packet is 16-bits and the communication speed is 250 kbps, the response trigger packet may be any packet length, and the present invention can still be applied even if the communication speed is different.

If the camera 100 receives and analyzes the response trigger packet, and based on the analyzed result determines that the response trigger packet is a self-addressed packet, after a predetermined period of time has elapsed, the camera 100 starts the first curtain traveling of the shutter 119, controls the image sensor 118, and starts accumulation. Further, when the response trigger packet is transmitted, the flash unit 101 waits for a predetermined period of time to elapse, and then performs the emitting operation.

In FIG. 15, the shutter speed indicates synchronous imaging of $\frac{1}{250}$ seconds, in which the time from when the shutter starts to travel until full open is 2 milliseconds, and the full open time of the shutter is 2 milliseconds. FIG. 16 is a timing chart illustrating in detail the camera shutter operation of the response trigger packet transmission timing and the flash operation of FIG. 15. As described above, the transmission completion timing of the response trigger packet and the reception completion timing are roughly the same timing. Based on this timing, predetermined times T1 and T2 are determined. The camera 100 and the flash unit 101 respectively wait for the predetermined times T1 and T2, and then start the next operation.

The camera 100 controls the first curtain traveling start timing of the shutter 119 by waiting only the predetermined time T1 from the reception completion of the response trigger packet so that the traveling start timing of the shutter 119 synchronizes with the emitting start timing of the flash unit 101. The traveling time of the shutter 119 is about 2 milliseconds. In consideration of the synchronization with the flash unit 101, the predetermined time T1 is set to 1 millisecond.

The flash unit 101 adjusts the emitting start timing by the predetermined time T2 of 3 milliseconds to synchronize with the first curtain traveling completion timing of the shutter 119 of the camera 100.

As described above, the camera 100 and the flash unit 101 can reliably exchange information by bidirectional wireless communication, and can perform flash synchronous imaging at the correct timing.

Although the present exemplary embodiment is described based on shutter first curtain synchronous imaging of the camera 100 and the flash unit 101, the system may be based on shutter second curtain synchronous imaging, or based on a synchronous imaging operation for synchronizing shutters among cameras.

In FIG. 15, under the control of the camera microcomputer 158, when the second curtain traveling of the shutter 119 is completed, the camera 100 changes the image sensor 118 from an accumulation state to a reading state, and starts reading of the image data. Simultaneously with this, the camera 100 transmits a packet for notifying the flash unit 101 that the sequence has finished (sequence finish of the camera transmission data). If a emitting command packet is received and the emitting is normally performed, the flash unit 101 communicates that fact to the camera 100 (normal emitting/Ack of the flash transmission data).

Under the control of the camera microcomputer 158, the camera 100 determines that the image captured this time is an image obtained when flash emitting is performed normally. Further, when recording the image, the camera 100 attaches this determination to a file as information about the imaging conditions, and stores the resultant file. On the other hand, if flash imaging is not performed normally, the camera 100 attaches that determination to the image file, and records the resultant file.

If the sequence finishes in this manner, the camera 100 and the flash unit 101 return to an idle state of waiting for SW1. At this stage, the camera 100 again periodically issues a beacon packet at 100 millisecond intervals, and the flash unit 101 performs a reception operation to operate the wireless communication apparatus at 100 millisecond intervals.

As described above, based on the transmission timing and the reception timing of a response trigger packet responding to the fact that a emitting command was received from a mater device by a slave device, the mater device and the slave device perform synchronous imaging. Consequently, the reliability of the communication pathway becomes higher, and the synchronization operation can be performed correctly.

Figure 18:
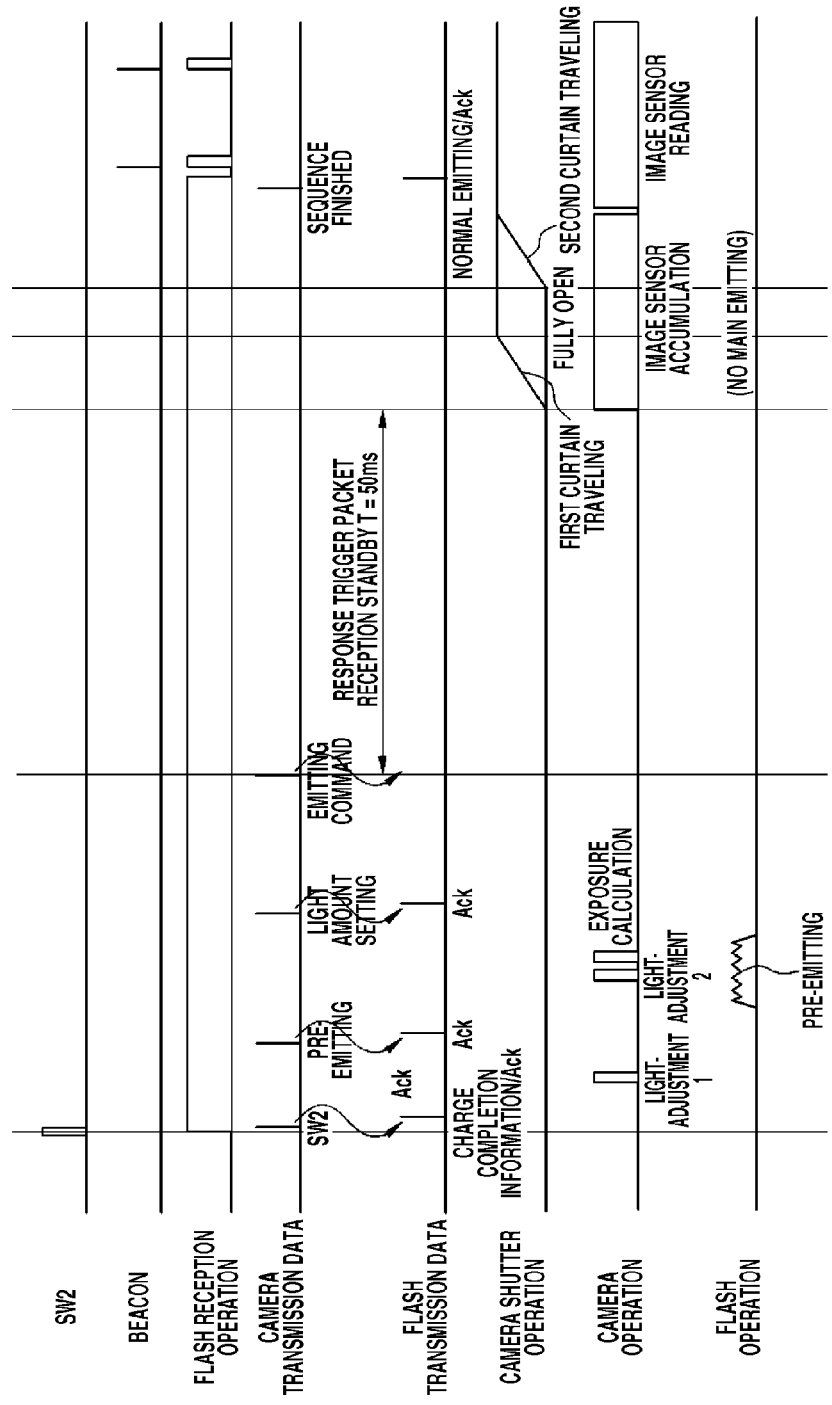
FIG. 18 is an example of a timing chart illustrating processing when transmission/reception of a response trigger packet failed.

However, the transmission/reception of the response trigger packet can fail due to obstructions which block communication between the camera 100 and the flash unit 101 or the occurrence of interference at the communication timing. FIG. 18 is a timing chart illustrating the processing in such a case.

Normally, in response to a command transmitted from the camera 100, the flash unit 101 transmits an Ack as a response packet, or a response trigger packet. In FIG. 18, when the SW2 of the camera 100 is turned on, the camera 100 starts the flash synchronous imaging operation. Up until the time the subsequent imaging operations finish, if communication with the flash unit 101 fails and re-transmission processing of the command packet is performed, the release time lag increases, and operability deteriorates. More specifically, in FIG. 18, in response to a SW2 command communication, pre-emitting communication, light amount setting communication, and emitting command communication from the camera 100, the flash unit 101 has to transmit a response packet at the precise timing. However, in FIG. 18, as illustrated by the arrows, although a response packet could be transmitted in response to the SW2 command communication, the pre-emitting communication, and the light amount setting communication, transmission/reception of the response packet (response trigger packet) in response to the emitting command communication has failed.

In this case, the camera 100 provides a time-out of T=50 milliseconds for the response packet waiting time. If the time out occurs, the camera 100 determines that the communication with the flash unit 101 has failed. Thus, response to an operation by the user is given priority, so that the flash synchronous imaging operation is abandoned, and the camera switches to an imaging operation using the camera by itself. Since the light adjustment operation (light-metering operation 1) is performed in advance, the exposure calculation when performing the imaging operation with the camera by itself is performed using that information. Based on this exposure calculation, the shutter speed and diaphragm are adjusted, and the sensitivity of the image sensor is increased, as necessary, to perform the imaging operation.

In the present invention, while the time-out of T=50 milliseconds is provided for the response trigger packet, the duration of the time out may be changed according to the demands of the system. Further, during the imaging operation of the camera 100, the time out may be similarly provided for the SW2 command communication, the pre-emitting communication, and the light amount setting communication, so that the camera switches to a simple imaging operation when a transmission/reception failure occurs.

Thus, when a response packet does not return even after a predetermined period of time has elapsed, the imaging operation is performed by the imaging apparatus by itself without performing re-transmission processing. Therefore, the imaging operation can be performed without hindering the response to an operation made by the user.

Figure 19:
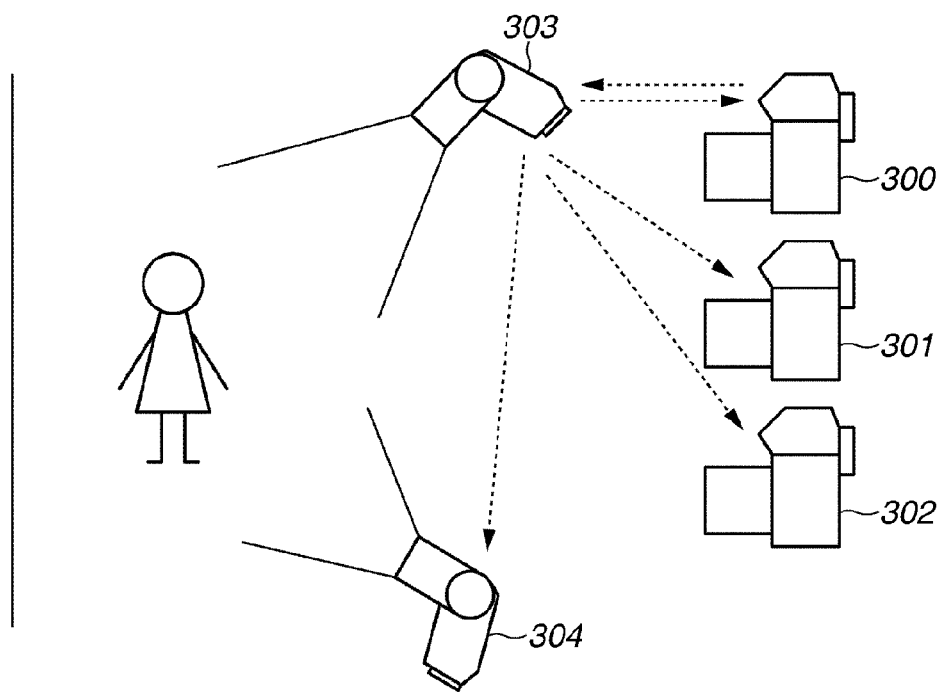
FIG. 19 is an example of a schematic diagram of a flash control camera system.

In a sixth exemplary embodiment, one master device and a plurality of slave devices are present. In FIG. 19, the system includes a camera 1900, which serves as a master device, and a camera 1901, camera 1902, a flash unit 1903, and a flash unit 1904, which are slave devices. The configuration of the respective cameras and flash units is similar to what is described in FIGS. 2 to 5, and thus a description thereof is omitted here.

In this case, based on a release operation of the camera 1900, the other slave devices are all synchronized, and flash synchronous imaging is performed. More specifically, the imaging operation is performed by synchronizing the cameras 1901 and 1902 with the camera 1900 and operating the shutters. Consequently, the flash units 1903 and 1904 are emitted at a timing where the shutter of the camera 1900 is fully open.

Figure 20:
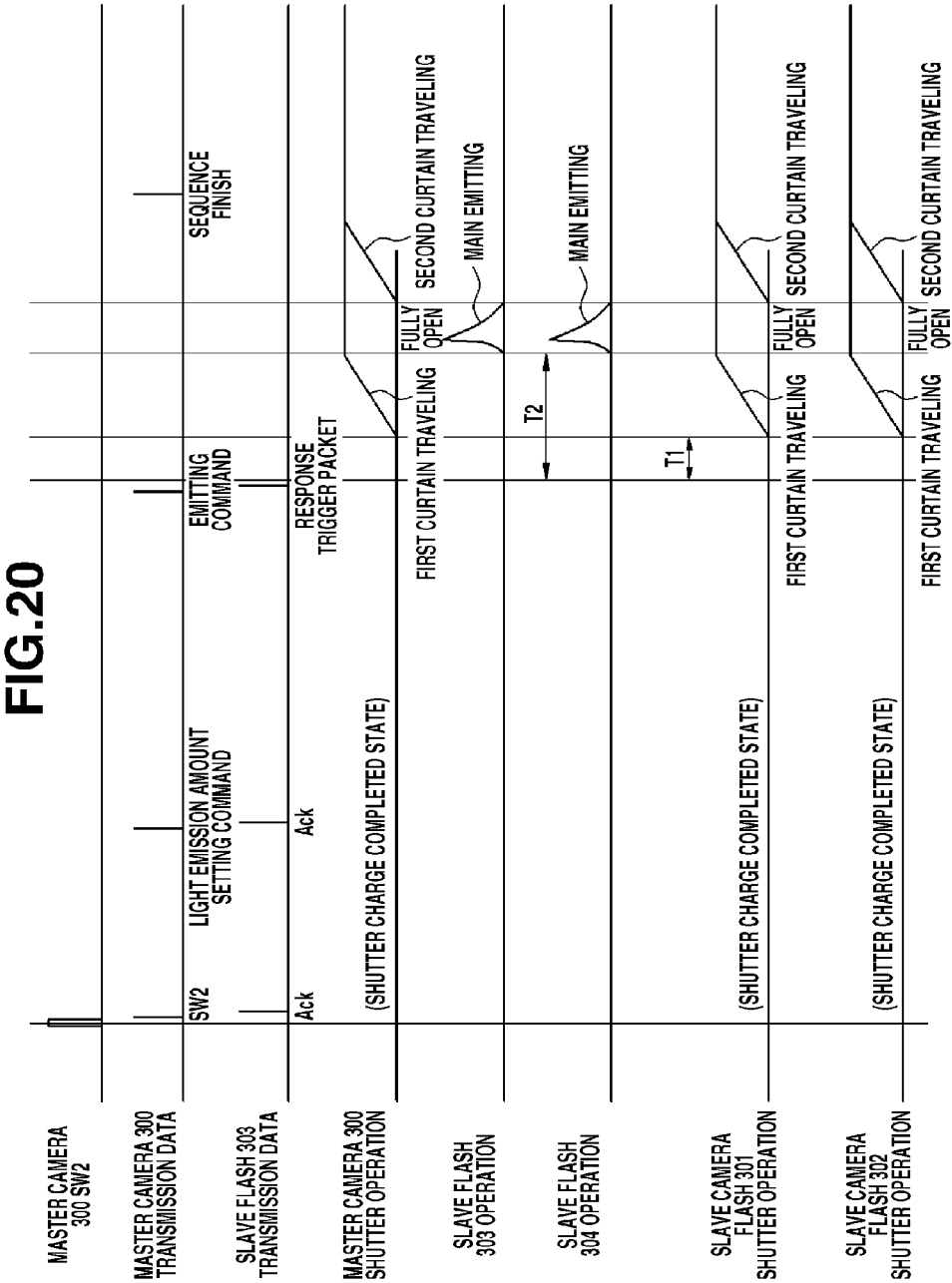
FIG. 20 is an example of a timing chart illustrating a sequence of flash synchronous imaging.

FIG. 20 is a timing chart illustrating the timing where the cameras and the flash units are operated in the present exemplary embodiment. First, by a similar method as in the fifth exemplary embodiment, the camera 1900 performs a light adjustment operation with the flash units 1903 and 1904, performs an exposure calculation, and determines a light emission amount of each of the flash units. The light emission amounts are set by communicating the determined amounts to each of the flash units 1903 and 1904. Information derived from the exposure calculation, such as the shutter speed and the diaphragm value, is also communicated to the cameras 1901 and 1902. The cameras 1901 and 1902 may use the exposure information obtained by this communication as set values as it is, or when imaging with different settings from those of the camera 1900, the exposure information obtained by this communication may be discarded, and imaging may be performed with their own settings.

After the imaging preparation has been thus finished, the camera 1900 transmits a emitting command packet to the flash unit 1903. Then, the flash unit 1903 responds to the emitting command packet by transmitting a response trigger packet. However, at this stage, the response trigger packet transmission destination is set not only as the camera 1900, but also as the camera 1901, the camera 1902, and the flash unit 1904. More specifically, in the response trigger packet illustrated in FIG. 17, a plurality of devices can be designated as the response destination information. If there are no other devices forming the wireless communication system, this is the same operation as if the response trigger packet is broadcast so that all devices can receive it. All of the devices perform the synchronous imaging operation based on the timing of transmission completion and reception completion of this response trigger packet.

The cameras 1900, 1901, and 1902 start the first curtain traveling of the shutter 119 by waiting only the predetermined time T1 from the reception completion timing of the response trigger packet. If the first curtain traveling times of the cameras 1900, 1901, and 1902 are different, the first curtains of the shutters 119 travel by slightly adjusting the predetermined time T1 based on the traveling times of the shutters 119 so that imaging synchronizing with each of the flash units 1903 and 1904 can be performed.

The flash unit 1903 waits only the predetermined time T2, and then starts flash emitting based on the timing of transmission completion of the response trigger packet. The flash unit 1904 waits only the predetermined time T2, and then starts flash emitting based on the timing of reception completion of the response trigger packet.

As described above, even if there is a plurality of slave devices, the camera 1900, which is the master device, transmits a emitting command to the flash unit 1903, which is a specific slave device. Then, the flash unit 1903 transmits a response trigger packet to the master device and to the other slave devices. Consequently, all of the devices can perform a synchronous imaging operation based on the transmission/reception timing of the response trigger packet.

Figure 21:
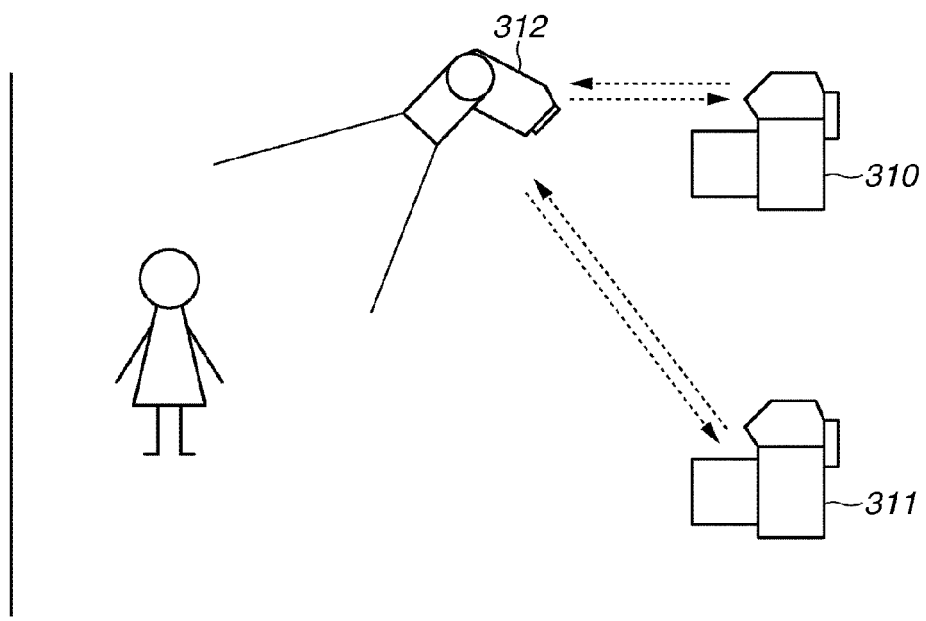
FIG. 21 is an example of a schematic diagram of a flash control camera system.

In a seventh exemplary embodiment, a plurality of master devices and one slave device are present. In FIG. 21, the system includes a camera 1910 and a camera 1911, which serve as master devices. The cameras 1910 and 1911 can perform imaging in synchronization with a flash unit 1912, which is a slave device, based on a release operation of each camera 1910 and 1911. The configuration of the respective cameras and the flash unit is similar to what is described in FIGS. 2 to 5, and thus a description thereof is omitted here.

When the cameras 1910 and 1911 individually perform the synchronous imaging operation, as described above, each of the synchronous imaging operations may be performed one-on-one with the flash unit 1912. However, when the synchronous imaging operation is to be performed with roughly the same timing, the control is different from the case of one-on-one.

FIG. 22 illustrates a case in which, when the cameras 1910 and 1911 try to perform the synchronous imaging operation with roughly the same timing, three devices, including the flash unit 1912, perform the imaging operation in synchronization (case of not performing exclusive control). In this case, in FIG. 21, the flash unit 1912 is set not to perform exclusive control by a switch setting on the flash itself or by an external communication setting. In this case, the response destination information of the response trigger packet generated by the flash unit 1912 is a broadcast transmitted to all the master devices and the slave devices on the network.

FIG. 22 is a timing chart illustrating the timing where cameras and flash units are operated in a case in which exclusive control is not performed in the present exemplary embodiment. When SW2 of the camera 1910 is turned on (i.e., a prior operation for transmitting the emitting packet was performed), the camera 1910 transmits a command notifying the flash unit 1912 of that fact. Consequently, the synchronous imaging operation of the camera 1910 and the flash unit 1912 starts. However, during that time, if SW2 of the camera 1911 is turned on, a command notifying the fact that SW2 was turned on is also transmitted from the camera 1911 to the flash unit 1912. In response, while the flash unit 1912 transmits a response packet (Ack), at that time, the flash unit 1912 also transmits a code communicating that simultaneous exposure with the camera 1910 will be performed. By doing this, unlike the case of performing the synchronous imaging operation with the flash unit 1912 one-on-one, the camera 1911 is in a response trigger packet standby state.

When the synchronous imaging operation preparation of the camera 1910 is completed, the camera 1910 transmits a emitting command to the flash unit 1912. In response, the flash unit 1912 transmits a response trigger packet. At this stage, as the response destination information, not only the camera 1910, but also information about the camera 1911 is transmitted.

When the response trigger packet from the flash unit 1912 is received, the cameras 1910 and 1911 wait only the predetermined time T1 from reception completion, and then start the first curtain traveling of each of the shutters 119. The flash unit 1912 waits only the predetermined time T2 from transmission completion, and then starts the emitting. Thus, the imaging operation is performed with all of the camera 1910, the camera 1911, and the flash unit 1912 synchronized.

As described above, when SW2 is turned on by the cameras 1910 and 1911 at the same time, and a emitting command is transmitted to the flash unit 1912, the flash unit 1912 transmits a single response trigger packet to the cameras 1910 and 1911, and the synchronous imaging operation is performed. Therefore, imaging can be performed with all of the devices synchronized, and a good image can be obtained. In such a case, the camera 1911 does not lose the opportunity to perform synchronous imaging with the flash unit 1912. In the present exemplary embodiment, the expression "the same time" refers to the time until the SW2 on one of the cameras is turned on, and the emitting command is transmitted from that camera.

FIG. 23 illustrates a case in which, when the cameras 1910 and 1911 try to perform the synchronous imaging operation with roughly the same timing, the camera 1910 which first tried to perform the imaging operation is given priority, and a synchronous imaging operation with the camera 1911 is not performed (case of performing exclusive control). In this case also, in FIG. 21, the flash unit 1912 is set to perform exclusive control by a switch setting on the flash itself or by an external communication setting.

FIG. 23 is a timing chart illustrating the timing where cameras and flash units are operated when exclusive control is performed in the present exemplary embodiment. When SW2 of the camera 1910 is turned on (a pre-operation of transmitting the emitting packet has been performed), the camera 1910 transmits a command notifying the flash unit 1912 of that fact. Consequently, the synchronous imaging operation of the camera 1910 and the flash unit 1912 starts. However, during that time if SW2 of the camera 1911 is turned on, a command notifying the fact that SW2 was turned on is also transmitted from the camera 1911 to the flash unit 1912. In response, the flash unit 1912 analyzes the contents of the command, and determines that the command is not a command from the camera 1910, which is the party currently starting the synchronous imaging operation. In this case, a control is performed so that a response packet (Ack) is not transmitted.

Similar to the case in which the synchronous imaging operation is performed one-on-one, the camera 1910 and the flash unit 1912 perform the light adjustment operation and the exposure calculation. At the stage where the synchronous imaging preparation is completed, the camera 1910 transmits a emitting command packet to the flash unit 1912. In response, the flash unit 1912 transmits a response trigger packet. However, this time, only information about the camera 1910 is transmitted as the response destination information. Information about the camera 1911 is not included.

By doing this, only the camera 1910 and the flash unit 1912 can perform synchronous imaging in the same manner as in one-on-one flash synchronous imaging, while the camera 1911 does not simultaneously perform synchronous imaging with the camera 1910. The camera 1910 transmits to the flash unit 1912 a command for communicating the finish of the sequence. In response, the flash unit 1912 transmits an Ack packet. Consequently, a single synchronous imaging operation is finished. After the finish, the flash unit 1912 is in a state in which the SW2 command packet from the camera 1911 can be received.

In this case, the camera 1911 loses the opportunity to perform synchronous imaging with the flash unit 1912. However, when exclusive control is not performed, as a result of the light adjustment operation performed by the camera 1910, flash synchronous imaging is performed. Consequently, it is difficult to perform imaging as intended by the user operating the camera 1911. In contrast, when exclusive control is performed, unnecessary imaging which the user did not intend can be avoided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A communication apparatus configured to wirelessly transmit an operating instruction for operating an external apparatus having a communication unit, the communication apparatus comprising:
    an input unit configured to input a predetermined trigger signal; and
        a transmission controlling unit configured to control transmitting a predetermined operating instruction more than once, the predetermined operating instruction being in a plurality of predetermined operating instructions and including timing information regarding an operating timing, in a case where the predetermined trigger signal is input by the input unit.

2. The communication apparatus according to claim 1, wherein the external apparatus is a flash device and the predetermined operating instruction is an emitting instruction for the flash device.

3. The communication apparatus according to claim 1, wherein the timing information includes information indicating a time period from when the external apparatus receiving the predetermined operation instructions and to execute the operation.

4. The communication apparatus according to claim 1, wherein the timing information includes information indicating an order of the predetermined operation instructions which are transmitted more than once by the transmission controlling unit.

5. The communication apparatus according to claim 1, wherein the predetermined trigger signal is a signal indicating that an operation of instructing an image capturing by an imaging apparatus connected to the communication apparatus is performed.

6. The communication apparatus according to claim 5, wherein the timing information is determined based on a timing when a shutter of the imaging apparatus is fully opened.

7. The communication apparatus according to claim 5, wherein the communication apparatus periodically issues a beacon signal to the external apparatus and changes an interval of issuing the beacon signal before and after an operation of instructing a preparation for the image capturing.

8. The communication apparatus according to claim 1, wherein the transmission controlling unit controls to broadcast the predetermined operating instruction more than once.

9. The communication apparatus according to claim 8, wherein the transmission controlling unit is capable of controlling to transmit a preliminary operating instruction in prior to the predetermined operating instruction, wherein the preliminary operating instruction is transmitted to each of a plurality of external apparatuses.

10. An external apparatus configured to establish wireless communication with a communication apparatus, the external apparatus comprising:
    a reception unit configured to receive predetermined operating instructions including timing information regarding operation timings, wherein the predetermined operating instructions are transmitted from the communication apparatus more than once; and
    An operation controlling unit configured to control an operation so that the operation is executed at a timing according to the timing information included in one of the predetermined operating instructions which is received by the reception unit.

11. The external apparatus according to claim 10, wherein in a case where the reception unit receives one of the predetermined operating instruction from the communication apparatus, the operation controls according to other predetermined operating instructions are not executed.

12. The external apparatus according to claim 10, wherein a flash device is connected to the external apparatus and the predetermined operating instruction is an emitting instruction for the flash device.

13. The external apparatus according to claim 10, wherein the timing information is information indicating a time for the operation to be executed from when the predetermined operating instruction is received from the external apparatus.

14. The external apparatus according to claim 10, wherein the timing information includes information indicating an order of the predetermined operation instructions which are transmitted more than once by the communication apparatus.

15. A method for controlling a communication apparatus configured to wirelessly transmit an operating instruction for operating an external apparatus having a communication unit, the method comprising:
    inputting a predetermined trigger signal; and
    controlling to transmit a predetermined operating instruction more than once, the predetermined operating instruction being in a plurality of predetermined operating instructions and including timing information regarding an operating timing, in a case where the predetermined trigger signal is input by the input unit.

16. A computer readable storage medium having instructions that, when executed by a processor, cause the processor to perform operations according to the method of claim 15.

17. A method for controlling en external apparatus configured to establish wireless communication with a communication apparatus, the method comprising:
    receiving predetermined operating instructions including timing information regarding operation timings, wherein the predetermined operating instructions are transmitted from the communication apparatus more than once; and
    controlling an operation so that the operation is executed at a timing according to the timing information included in the predetermined operating instruction which is firstly received at the receiving step.

18. A computer readable storage medium having instructions that, when executed by a processor, cause the processor to perform operations according to the method of claim 17.

* * * * *